United States Patent
Ueshima et al.

(10) Patent No.: US 8,009,866 B2
(45) Date of Patent: Aug. 30, 2011

(54) EXERCISE SUPPORT DEVICE, EXERCISE SUPPORT METHOD AND RECORDING MEDIUM

(75) Inventors: Hiromu Ueshima, Shiga (JP); Keiichi Yasumura, Shiga (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 767 days.

(21) Appl. No.: 12/110,316

(22) Filed: Apr. 26, 2008

(65) Prior Publication Data
US 2009/0268949 A1 Oct. 29, 2009

(51) Int. Cl.
*G06K 9/00* (2006.01)

(52) U.S. Cl. ........ 382/103; 382/106; 382/153; 382/154; 348/94; 348/119; 348/154

(58) Field of Classification Search .................. 382/103, 382/106, 107, 153–154; 348/94–95, 119, 348/154–155
See application file for complete search history.

(56) References Cited

U.S. PATENT DOCUMENTS

| 5,612,881 | A  | * | 3/1997 | Moroto et al. ................. 701/209 |
| 6,480,761 | B2 | * | 11/2002 | Ueno et al. ..................... 700/245 |
| 6,725,080 | B2 | * | 4/2004 | Melkent et al. ............... 600/424 |
| 7,206,627 | B2 | * | 4/2007 | Abovitz et al. ............... 600/407 |
| 2006/0018516 | A1 | * | 1/2006 | Masoud et al. ............... 382/115 |
| 2006/0098851 | A1 | * | 5/2006 | Shoham et al. ............... 382/128 |
| 2007/0073514 | A1 | * | 3/2007 | Nogimori et al. ............. 702/160 |
| 2007/0213128 | A1 | * | 9/2007 | Ohta ................................ 463/36 |
| 2008/0146329 | A1 | * | 6/2008 | Kodama et al. ................. 463/31 |
| 2008/0294258 | A1 | * | 11/2008 | Revie et al. ................. 623/16.11 |
| 2009/0231269 | A1 | * | 9/2009 | Ueshima et al. ............... 345/156 |

* cited by examiner

*Primary Examiner* — Manav Seth
(74) *Attorney, Agent, or Firm* — Jackson Patent Law Office

(57) ABSTRACT

An imaging unit captures images of the retroreflective sheets worn on both legs. A multimedia processor detects step and jump of a player on the basis of the pictures obtained by the image capturing to reflect to a video image and thereby the interactive system is constituted. It is possible to support a user so as to continuously perform a stepping exercise while reducing an economical burden of the user and realizing the space saving.

7 Claims, 21 Drawing Sheets

Fig. 3
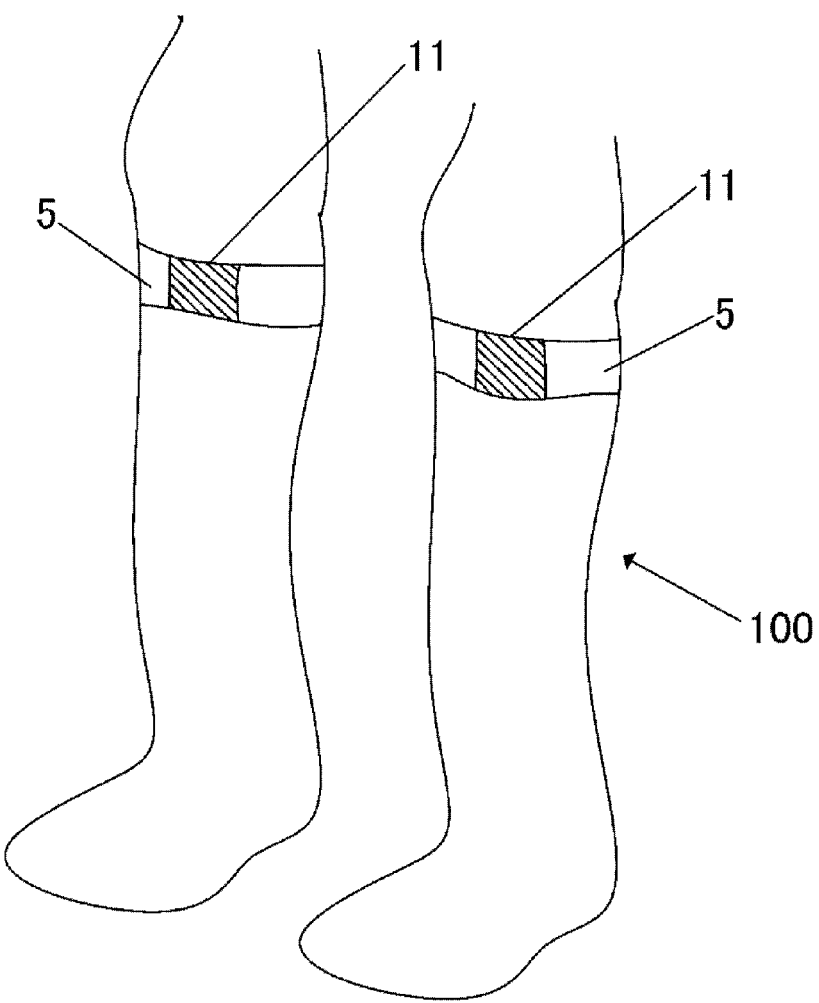
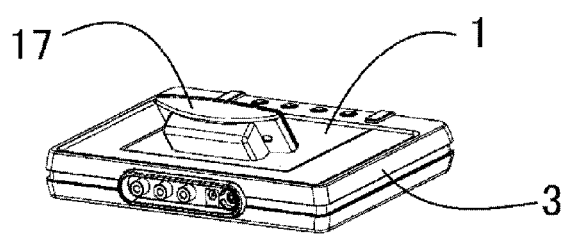

EXERCISE SUPPORT DEVICE, EXERCISE SUPPORT METHOD AND RECORDING MEDIUM

BACKGROUND OF THE INVENTION

1. Field of the Invention

The present invention relates to an exercise support device and the related arts for supporting a stepping exercise.

2. Description of the Related Art

The Patent Document 1 (Jpn. unexamined patent publication No. Hei 6-91018) discloses a stepper where a user places a left foot and right foot on a left pedal and a right pedal respectively to push them down alternately at left and right sides. In this way, the stepper exercises the user. Since the stepping exercise using the stepper is monotonous, considerable effort is required for performing continuously for a long period of time. The same is true for an exercise using a cycling machine.

Therefore, in the Patent Document 2 (Jpn. unexamined patent publication No. 2003-205051), a special computer links a cycling machine with a monitor and displays a video image in accordance with movements of pedals on the monitor, and thereby an exercise support device capable of supporting a user so as to continuously exercise is provided.

However, the exercise support device as shown in the Patent Document 2 requires the cycling machine and the special computer, and therefore the user has to purchase them. As a result, it is great expensive involved for the user and also a relatively large installation site is required.

SUMMARY OF THE INVENTION

It is therefore an object of the present invention to provide an exercise support device and the related techniques thereof capable of supporting a user so as to continuously perform a stepping exercise while reducing an economical burden of the user and realizing the space saving.

In accordance with a first aspect of the present invention, an exercise support device comprises: an image generating unit operable to generate an image which guides stepping action of a player; an imaging unit operable to capture an image of a first reflecting member worn on a left leg of the player and an image of a second reflecting member worn on a right leg of the player; a detecting unit operable to detect the first reflecting member and the second reflecting member on the basis of a result of capturing by said imaging unit; an analyzing unit operable to analyze a motion of the first reflecting member and a motion of the second reflecting member on the basis of a result of detecting by said detecting unit; and a processing unit operable to perform information processing in accordance with a result of analyzing by said analyzing unit to reflect to a video image.

In accordance with this configuration, in addition to a guide of stepping, since the motions of the first reflective member and the second reflective member, i.e., the motions of both legs of the player are reflected in a video image, it is possible to provide the interactive exercise support device. Accordingly, since the response to stepping is returned, it is possible to add amusingness to monotonous stepping, and thereby it is possible to support the continuance of the stepping exercise. In addition, since a special exercise machine is not required and it is enough that the first reflective member and the second reflective member are only worn on the legs, it is possible to reduce an economical burden of the user and realize the space saving.

Further, since the player 100 wears the first reflective member and the second reflective member and the multimedia processor 21 analyzes the respective motions of the both legs, it is possible to provide many more exercise items in comparison with a case of analyzing only motion of one leg. For example, in a case of analyzing only motion of one leg, step is detectable but jump is undetectable. On the other hand, in a case of analyzing motions of both legs, jump is detectable in addition to step. Therefore, it is possible to add an item that instructs the player to jump.

In the above exercise support device, said image generating unit generates the image which guides jumping action of the player.

In the above exercise support device, the first reflecting member and the second reflecting member reflect received light retroreflectively.

Above exercise support device further comprises: a light emitting unit operable to emit light intermittently, wherein said imaging unit captures images of the first reflecting member and the second reflecting member with light illumination and without light illumination of said light emitting unit, and said detecting unit detects the first reflecting member and the second reflecting member on the basis of a picture which is obtained by the image capturing with light illumination and a picture which is obtained by the image capturing without light illumination.

In the above exercise support device, said imaging unit capture an image of the first reflecting member worn just under a left knee of the player and an image of the second reflecting member worn just under a right knee of the player.

In accordance with this configuration, in the case where the imaging unit is placed on a floor and the player performs the stepping action, it is more certainly possible to capture images of the first reflective member and the second reflective member in any state.

In accordance with a second aspect of the present invention, an exercise support method comprises the steps of: generating an image which guides stepping action of a player; capturing an image of a first reflecting member worn on a left leg of the player and an image of a second reflecting member worn on a right leg of the player; detecting the first reflecting member and the second reflecting member on the basis of a result of said step of capturing; analyzing a motion of the first reflecting member and a motion of the second reflecting member on the basis of a result of said step of detecting; and performing information processing in accordance with a result of said step of analyzing to reflect to a video image.

In accordance with this configuration, there are the similar advantages to the above exercise device in accordance with the first aspect.

In accordance with a third aspect of the present invention, a computer-readable recording medium encoded with a computer program which enables a computer to perform a process, the process comprising: generating an image which guides stepping action of a player; capturing an image of a first reflecting member worn on a left leg of the player and an image of a second reflecting member worn on a right leg of the player; detecting the first reflecting member and the second reflecting member on the basis of a result of said step of capturing; analyzing a motion of the first reflecting member and a motion of the second reflecting member on the basis of a result of said step of detecting; and performing information processing in accordance with a result of said step of analyzing to reflect to a video image.

In accordance with this configuration, there are the similar advantages to the above exercise device in accordance with the first aspect.

For example, the recording medium includes a flexible disk, a hard disk, a magnetic tape, a magnet-optical disk, a CD (including a CD-ROM and Video-CD), a DVD (including a DVD-Video, a DVD-ROM, and a DVD-RAM), a ROM cartridge, a RAM cartridge with battery backup, a flash memory cartridge, a nonvolatile RAM cartridge, and so on.

BRIEF DESCRIPTION OF THE DRAWINGS

The novel features of the invention are set forth in the appended claims. The invention itself, however, as well as other features and advantages thereof, will be best understood by reading the detailed description of specific embodiments in conjunction with the accompanying drawings.

FIG. 3 is a view showing a wearing condition of the input instrument 5 of FIG. 1.

DESCRIPTION OF THE PREFERRED EMBODIMENTS

Figure 1:
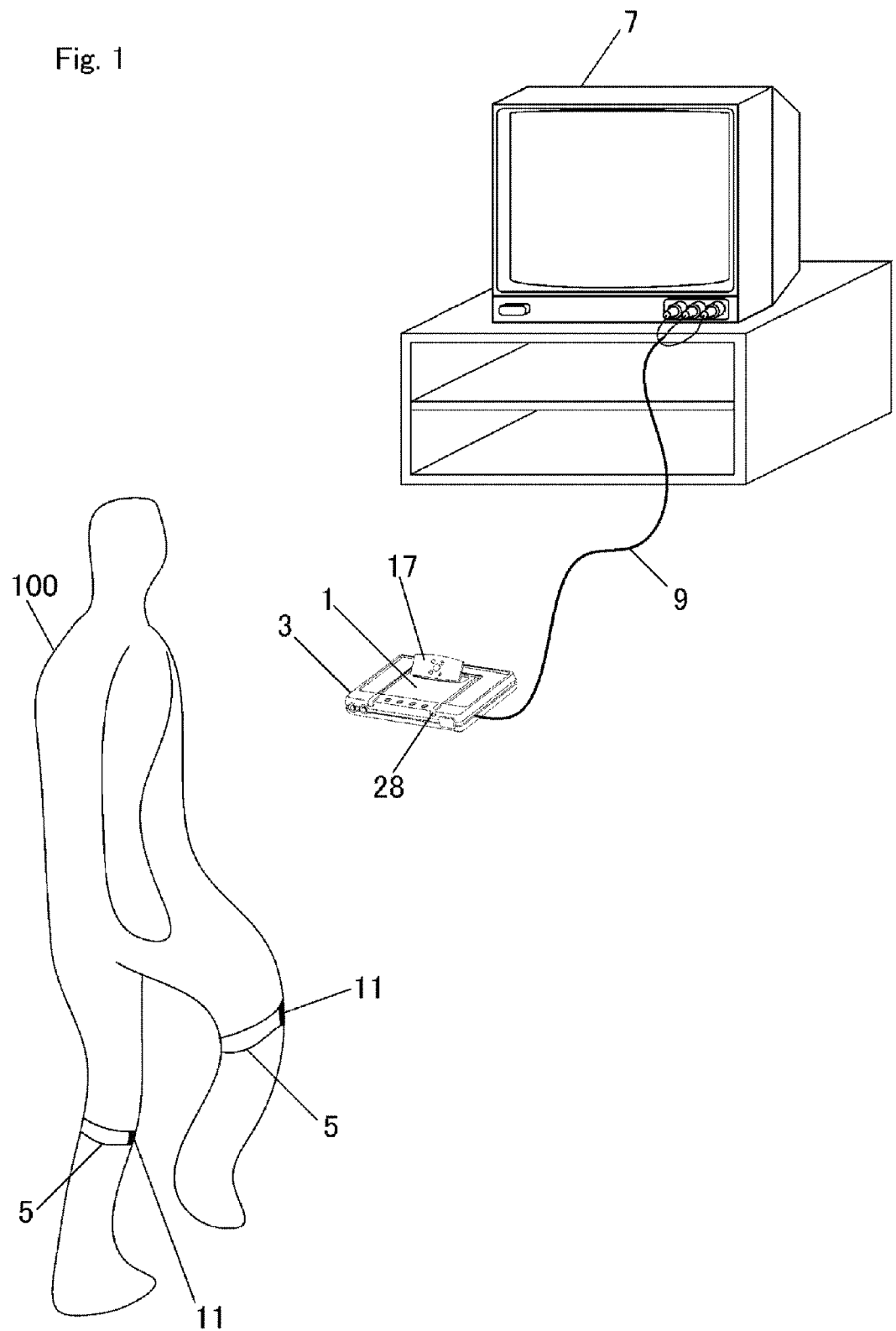
FIG. 1 is a schematic diagram showing the entire configuration of an exercise support system in accordance with an embodiment of the present invention.

FIG. 1 is a schematic diagram showing the entire configuration of an exercise support system in accordance with an embodiment of the present invention. As shown in FIG. 1, this exercise support system is provided with input instruments 5 which are worn on the left and right legs of a player 100, a cartridge 1 with an imaging unit 17, an adaptor 3 with a cancel key 28, and a television monitor 7. The cartridge 1 is electrically connected into the adaptor 3. Also, the adaptor 3 is connected with the television monitor 7 by an AV cable 9.

Figure 2:
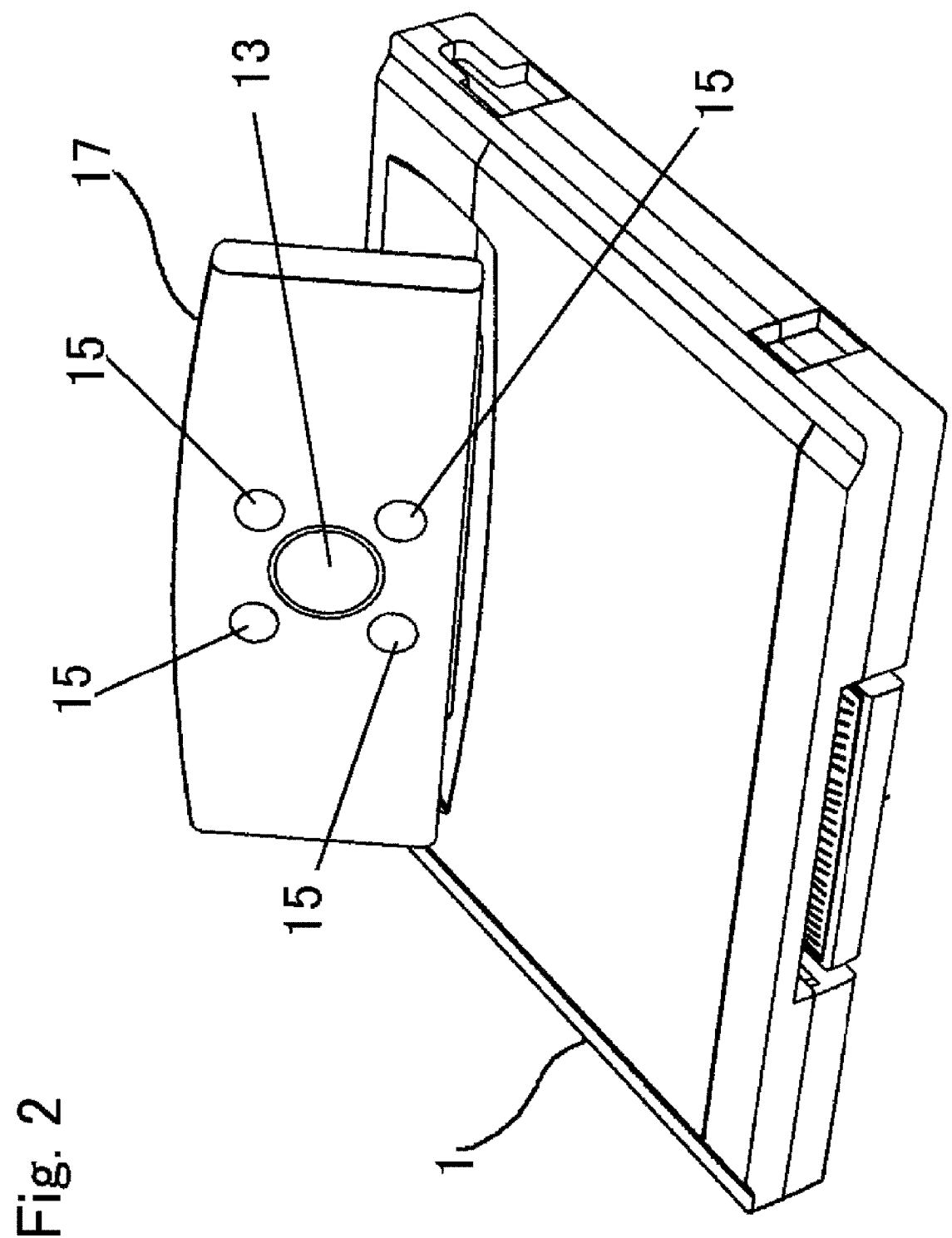
FIG. 2 is a perspective view of the cartridge 1 of FIG. 1.

FIG. 2 is a perspective view of the cartridge 1 of FIG. 1. As shown in FIG. 2, the cartridge consists of a body in the form of a flat rectangular parallelepiped and the imaging unit 17. The imaging unit 17 is fixed on the upper surface of the body of the cartridge 1. In this case, the imaging unit 17 is fixed in such a manner that the surface thereof inclines by a predetermined angle (e.g., 40 degrees) to the surface of the cartridge 1. The imaging unit 17 is provided with a circular infrared filter 13 which is located in the center of the surface thereof, and there are four infrared light emitting diodes 15 which are located around the infrared filter 13. An image sensor 32 to be described below is located behind the infrared filter 13.

FIG. 3 is a view showing a wearing condition of the input instrument 5 of FIG. 1. As shown in FIG. 3, the each input instrument 5 has a belt-shaped form, e.g., made of nylon. Also, rectangle-shaped retroreflective sheets 11 are attached to the input instruments 5 respectively. A player 100 wears the input instruments 5 just under the knees. In this case, the retroreflective sheets 11 are worn in such a manner that the retroreflective sheets 11 direct at the imaging unit 11. The Velcro (a registered trademark) tapes are attached to the input instruments 5, and thereby the player 100 can easily wear them. Meanwhile, the adaptor 3 into which the cartridge 1 is inserted is placed on the position where the retroreflective sheets 11 are included within an imaging range of the imaging unit 17.

Figure 4:
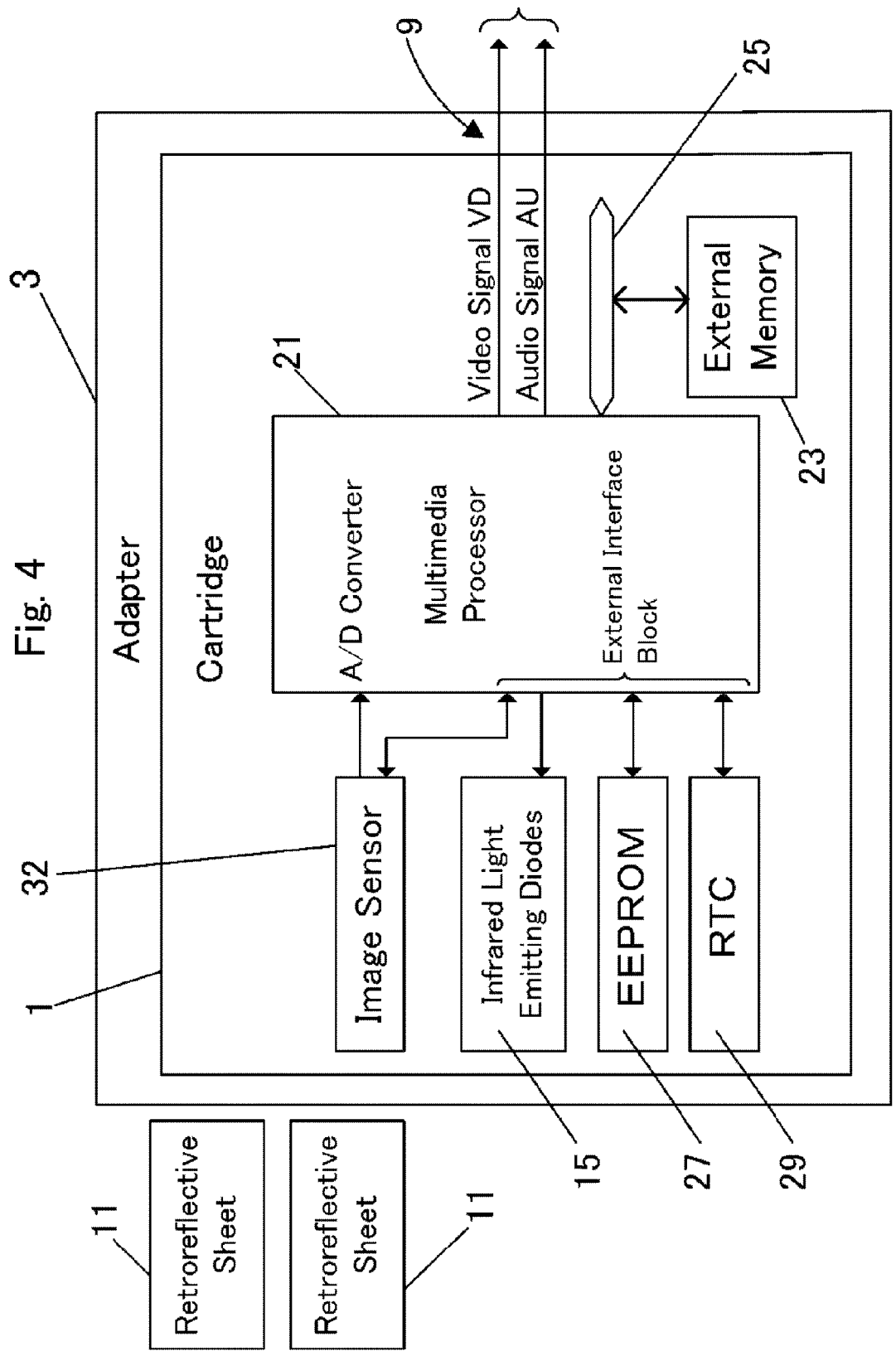
FIG. 4 is a schematic diagram showing the electric configuration of the cartridge 1 of FIG. 1.

FIG. 4 is a schematic diagram showing the electric configuration of the cartridge 1 of FIG. 1. As shown in FIG. 4, the cartridge 1 comprises a multimedia processor 21, the image sensor 32, the infrared diodes 15, an external memory 23, an EEPROM (electrically erasable programmable read only memory) 27, an RTC (real time clock), and a bus 25.

The multimedia processor 21 can access the external memory 23 through the bus 25. Accordingly, the multimedia processor 21 can perform programs stored in the external memory 23, and read and process the data stored in the external memory 23. The programs for executing the respective processes represented by flowcharts as described below, image data, sound data and the like are written to in this external memory 23 in advance. Meanwhile, the external memory 23 may be implemented with one or any necessary combination of a ROM, a RAM, and/or a flash memory, and so on in accordance with the system requirements.

Although not shown in the figure, this multimedia processor 21 is provided with a central processing unit (referred to as the "CPU" in the following description), a graphics processing unit (referred to as the "GPU" in the following description), a sound processing unit (referred to as the "SPU" in the following description), a geometry engine (referred to as the "GE" in the following description), an external interface block, a main RAM, and an A/D converter (referred to as the "ADC" in the following description) and so forth.

The CPU performs various operations and controls the overall system in accordance with the programs stored in the external memory 23. The CPU performs the process relating to graphics operations, which are performed by running the program stored in the external memory 23, such as the calculation of the parameters required for the expansion, reduction, rotation and/or parallel displacement of the respective objects and the calculation of eye coordinates (camera coordinates) and a view vector. In this description, the term "object" is used to indicate a unit which is composed of one or more polygons or sprites and to which expansion, reduction, rotation and parallel displacement transformations are applied in an integral manner.

The GPU serves to generate a three-dimensional image composed of polygons and sprites on a real time base, and converts it into an analog composite video signal. The SPU generates PCM (pulse code modulation) wave data, amplitude data, and main volume data, and generates analog audio signals from them by analog multiplication. The GE performs geometry operations for displaying a three-dimensional image. Specifically, the GE executes arithmetic operations such as matrix multiplications, vector affine transformations, vector orthogonal transformations, perspective projection transformations, the calculations of vertex brightnesses/polygon brightnesses (vector inner products), and polygon back face culling processes (vector cross products).

The external interface block is an interface with peripheral devices (the image sensor 32, the infrared light emitting diodes 15, the EEPROM 27, and the RTC 29 in the case of the present embodiment) and includes programmable digital input/output (I/O) ports of 24 channels. The ADC is connected to analog input ports of 4 channels and serves to convert an analog signal, which is input from an analog input device (the image sensor 32 in the case of the present embodiment) through the analog input port, into a digital signal. The main RAM is used by the CPU as a work area, a variable storing area, a virtual memory system management area and so forth.

The multimedia processor 21 drives the four infrared light emitting diodes 15 intermittently to intermittently flash the infrared light and thereby stroboscopic imaging is realized. The infrared light emitted by the infrared light emitting diodes 15 is reflected by the retroreflective sheets 11 of the input instruments 5 and is input the image sensor 32 through the infrared filter 13. Accordingly, the image sensor 32 outputs a picture signal including images of the retroreflective sheets 11 (when the infrared light is emitted) to the multimedia processor 21. Since the infrared light emitting diodes 15 are intermittently driven, the image sensor 32 outputs a picture signal even in a non-emission period of infrared light.

These analog picture signals output from the image sensor 32 are converted into digital picture signals by the ADC incorporated in the multimedia processor 21. The multimedia processor 21 calculates the difference between the digital picture signal with infrared light illumination and the digital picture signal without infrared light illumination, and then detects the retroreflective sheets 11 on the basis of this differential signal "DI" (differential picture "DI") to analyze movements of the retroreflective sheets 11. It is possible to eliminate, as much as possible, noise of light other than the light reflected from the retroreflective sheets 11 by obtaining the difference so that the retroreflective sheets 11 can be detected with a high degree of accuracy.

The multimedia processor 21 performs graphic processing, sound processing, and the other operation based on the analysis result of the movements of the retroreflective sheets 11, and then outputs a video signal VD and an audio signal AU. The video signal VD and the audio signal AU generated by the multimedia processor 21 are supplied to the television monitor 7 through the adaptor 3 and the AV cable 9 in order to display a video image corresponding to the video signal VD on the television monitor 7 and output a sound corresponding to the audio signal AU from a speaker thereof (not shown in the figure). Meanwhile, the adaptor 3 supplies the video signal VD generated by the multimedia processor 21 to the AV cable 9 with doing nothing, and amplifies the audio signal AU to supply it to the AV cable 9.

The EEPROM 27 is connected with the external interface block of the multimedia processor 21, and thereby data is read therefrom and is written thereto. The RTC 29 times on the basis of a crystal oscillator (not shown in the figure) and generate time information to give it to the multimedia processor 21.

Figure 5:
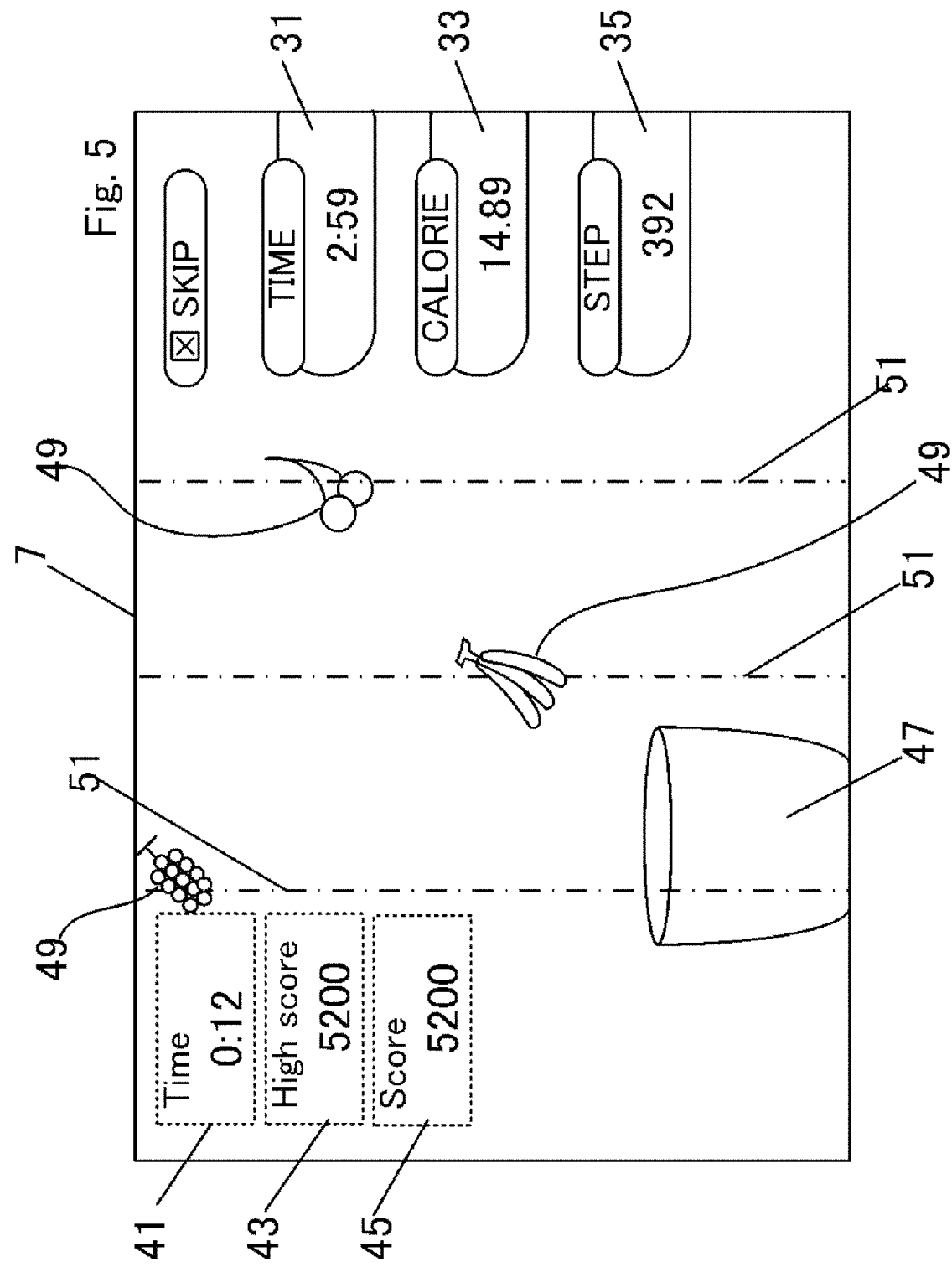
FIG. 5 is a view showing an example of an exercise support screen which is displayed on the television monitor 7 of FIG. 1.

FIG. 5 is a view showing an example of an exercise support screen which is displayed on the television monitor 7 of FIG. 1. Referring to FIG. 5, this exercise support screen includes a time display part 35 which displays total exercise time on the day, a calorie display part 33 which displays total calories on the day, a step display part 35 which displays the total number of steps on the day, a time display part 41 which displays elapsed time of the exercise item guided by this exercise support screen, a high score display part 43 which displays the highest value of past scores, a score display part 45 which displays a score, a operation object 47 (an appearance of a basket in the figure) which horizontally moves in response to the motion of the player 100, and moving objects 49 (appearances of fruits in the figure) which move down from the top edge to the bottom edge along lanes 51. Meanwhile, the lanes 51 are not displayed actually.

The multimedia processor moves the operation object 47 to the direction (left or right) corresponding to the direction of the jump (left or right) if the jump of the player 100 is detected. Accordingly, the player 100 jumps to control the operation object and tries to catch the moving object 49 moving down at a good timing. The multimedia processor 21 determines a success of catching if the moving object 49 is located within a prescribed range of in lower and upper sides around the top edge of the operation object 47. The multimedia processor 21 gives points to add the points to points of the score display part 45 if determining the success of catching. The multimedia processor 21 produces and moves down the moving objects 49 one after another until the time displayed on the time display part 41 reaches a predetermined time.

Meanwhile, in the present embodiment, a step of a player means the motion that the player 100 raises one foot on a floor, and then lowers the one foot to place it on the floor again. Accordingly, repetition of the left and right alternate steps corresponds to stepping. One jump converts into two steps to be accumulated in the step display part 35. Also, a calorie consumed by the player 100 is calculated on the basis of the number of steps, the body height and weight input by the player 100 in advance, and a formula of calculating the calorie consumption stored in advance, and then the calorie is accumulated in the calorie display part 33. Further, a period of time when the player 100 exercises is measured to be accumulated in the time display part 31.

Figure 6:
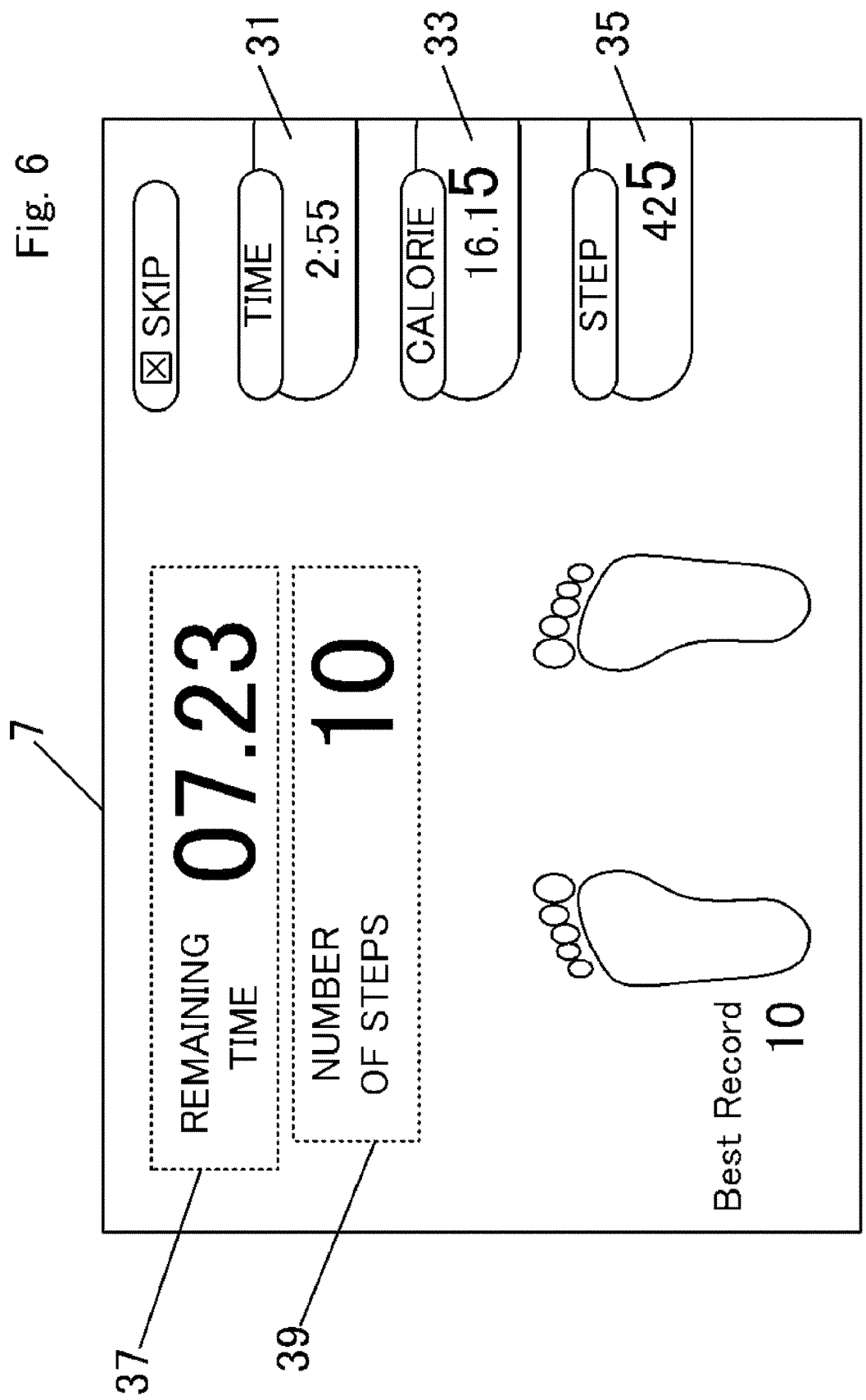
FIG. 6 is a view showing the other example of an exercise support screen which is displayed on the television monitor 7 of FIG. 1.

FIG. 6 is a view showing the other example of an exercise support screen which is displayed on the television monitor 7 of FIG. 1. Referring to FIG. 6, this exercise support screen includes the time display part 31, the calorie display part 33, the step display part 35, a time display part 37 which displays remaining time of an exercise item guided by this exercise support screen, and a step display part 39 which displays the number of steps in the exercise item guided by this exercise support screen.

The multimedia processor 21 performs count-down operation from 10 seconds to display it on the time display part 37. The player 100 tries to step as fast as possible. The multimedia processor 21 detects stepping motion of the player to display the number of steps on the step display part 39. Finally, the step display part 39 displays the number of steps performed by the player 100 during 10 seconds.

Figure 7:
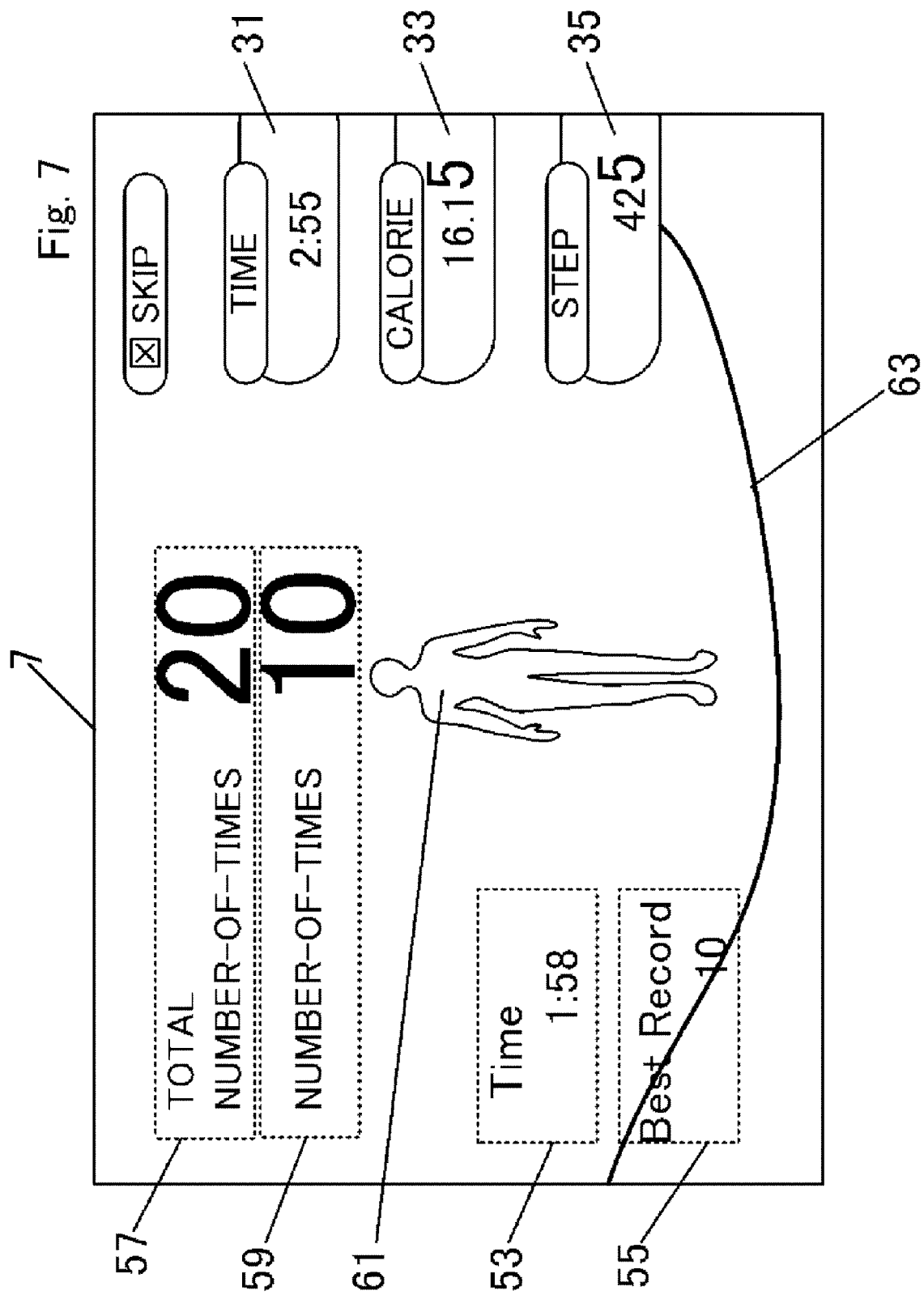
FIG. 7 is a view showing the further other example of an exercise support screen which is displayed on the television monitor 7 of FIG. 1.

FIG. 7 is a view showing the further other example of an exercise support screen which is displayed on the television monitor 7 of FIG. 1. Referring to FIG. 7, this exercise support screen includes the time display part 31, the calorie display part 33, the step display part 35, a player character 61 which jumps in response to the jump of the player 100, a skipping rope 63 used by the player character 61, a total number-of-times display part 57 which displays the total success frequency of the jump-rope, a continuous number-of-times display part 59 which displays the consecutive success frequency of the jump-rope, a time display part 53 which displays elapsed time of an exercise item guided by this exercise support screen, and a best record display part 55 which displays the highest value of the past total success frequencies.

The multimedia processor 21 makes the player character 61 jump if the jump of the player 100 is detected. Also, the multimedia processor 21 turns the skipping rope 63 as if a skipping rope turns. Then, the multimedia processor 21 displays a video image where the player character 61 skips the skipping rope 63 successfully if the player character 61 jumps while the skipping rope 63 is located within a predetermined rage around the lowest point thereof. However, the multimedia processor 21 displays a video image so as to fail a jump-rope if the player character 61 jumps at the other timing.

As described above, since the player character 61 jumps in synchronism with the jump of the player 100, the player 100 has to jump at the timing when the skipping rope 63 reaches the lowest point to make the player character 61 jump. The multimedia processor 21 displays the consecutive success frequency of jump-rope by the player character 61 on the continuous number-of-times display part 59, and also displays the total success frequency of jump-rope by the player character 61 in this exercise item on the total number-of-times display part 57. The multimedia processor 21 repeats the above processing until the time of the time display part 53 reaches a predetermined time.

Figure 8:
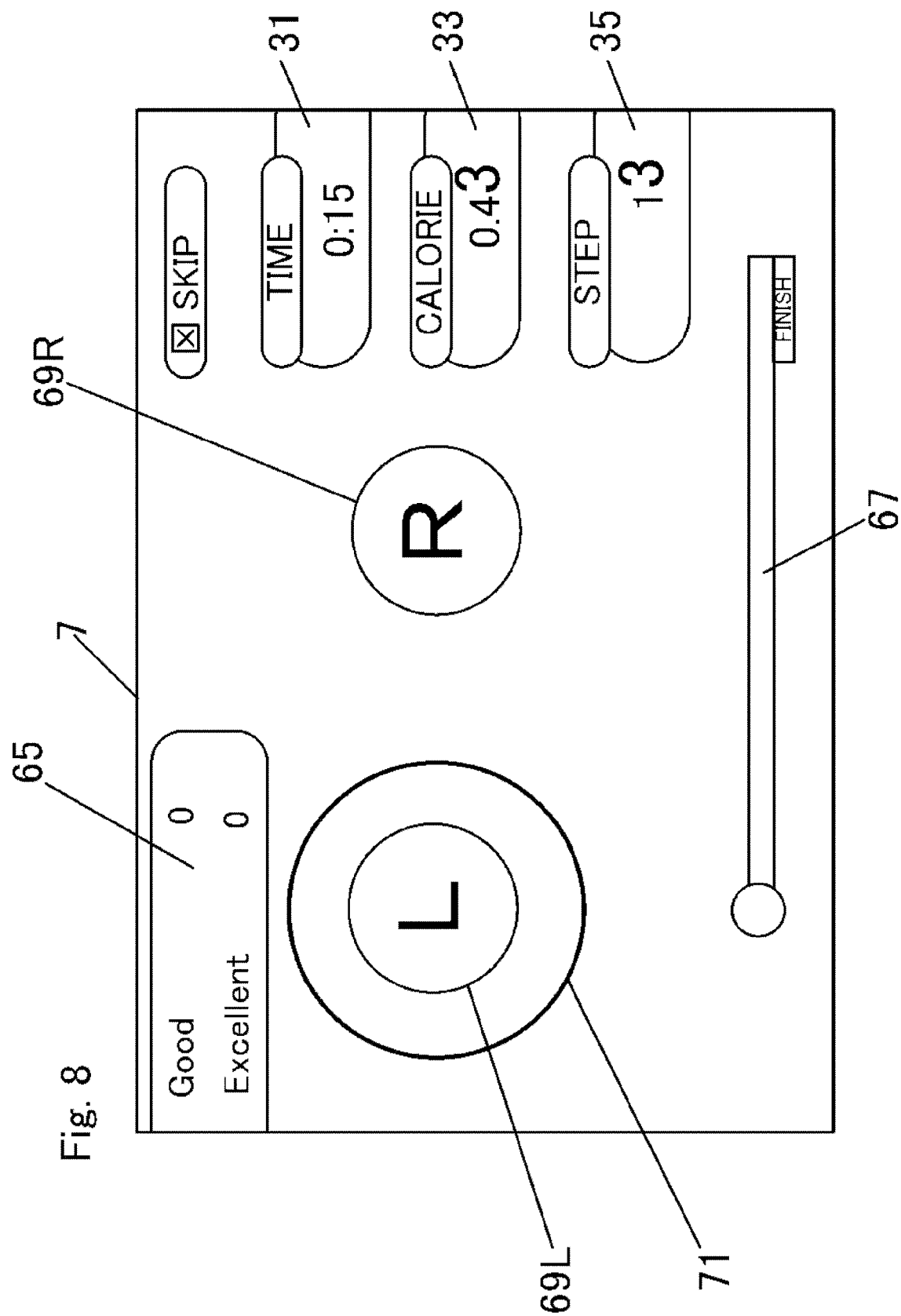
FIG. 8 is a view showing the still further other example of an exercise support screen which is displayed on the television monitor 7 of FIG. 1.

FIG. 8 is a view showing the still further other example of an exercise support screen which is displayed on the television monitor 7 of FIG. 1. Referring to FIG. 8, this exercise support screen includes the time display part 31, the calorie display part 33, the step display part 35, an evaluation display part 65, a left mark 69L, a right mark 69R, and a gauge 67 for indicating the extent to which music has advanced in the whole. The left mark 69L and the right mark 69R are generally referred to as the "marks 69".

The multimedia processor 21 playbacks music. In this case, the multimedia processor 21 displays a large circle 71 surrounding the mark 69 and then shrinks the circle 71 toward the mark 69. The player 100 tries to step with the foot indicated by the mark 69 at the timing when the circle 71 overlaps with the edge of the mark 69. In this case, the left mark 69L indicates the step with the left foot and the right mark 69R indicates the step with the right foot.

The multimedia processor 21 provides the evaluation of "EXCELLENCE" if the step with the foot indicated by the mark 69 is detected while the circle 71 is located within a first predetermined range around the edge (circle) of the mark 69, and provides the evaluation of "GOOD" if the step with the foot indicated by the mark 69 is detected while the circle 71 is located within a second predetermined range around the first predetermined range. The multimedia processor 21 displays the frequency to each evaluation on the evaluation display part 65.

The multimedia processor 21 allows the circle 71 to appear in such a manner that the player 100 can performs the stepping action in synchronism with the music if the player 100 steps with the relevant foot at the timing when the circle 71 reaches the edge (circle) of the mark 69. The multimedia processor 21 repeats the above processing until the music is completed.

Figure 9:
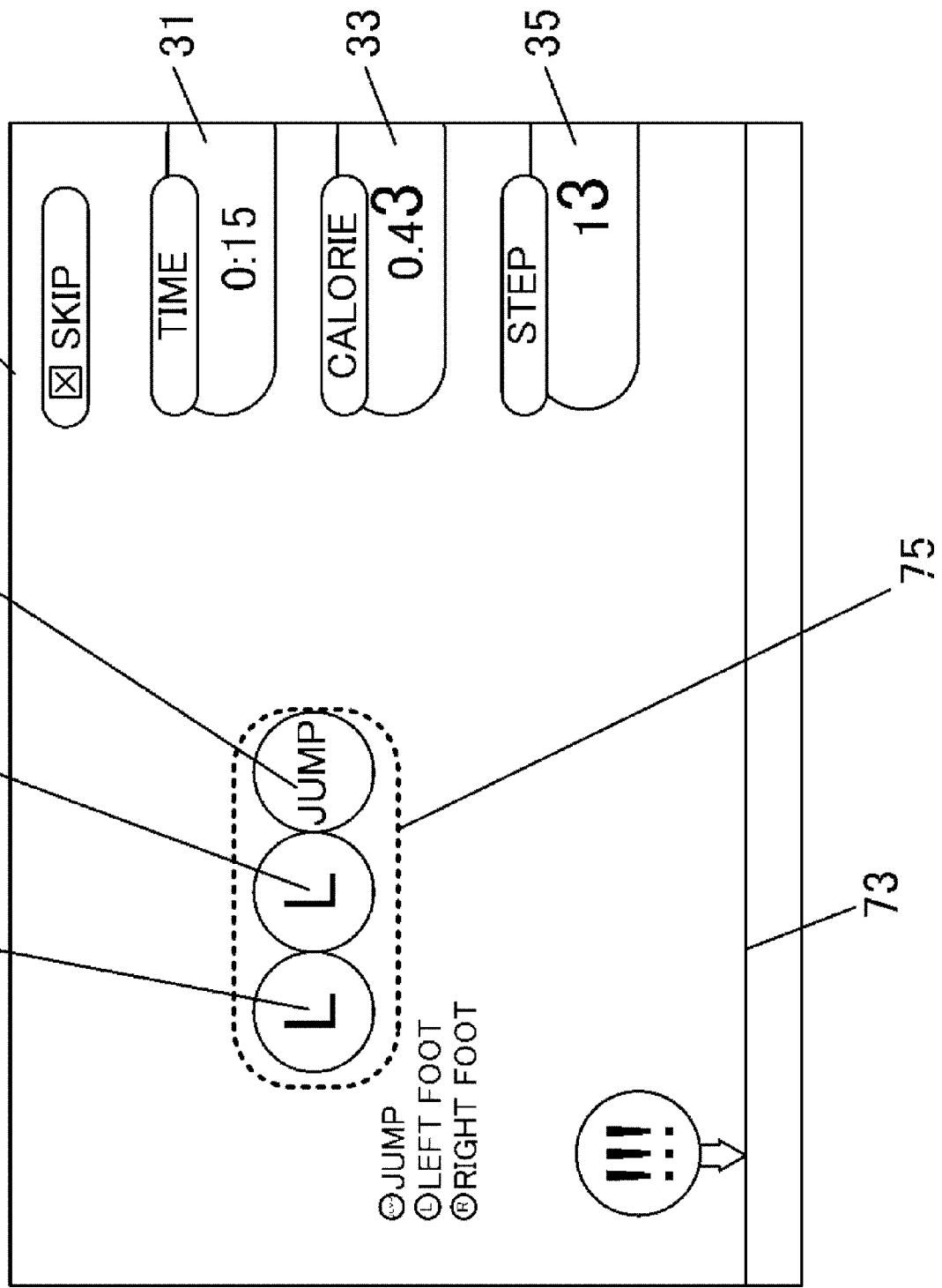
FIG. 9 is a view showing the still further other example of an exercise support screen which is displayed on the television monitor 7 of FIG. 1.

FIG. 9 is a view showing the still further other example of an exercise support screen which is displayed on the television monitor 7 of FIG. 1. Referring to FIG. 9, this exercise support screen includes the time display part 31, the calorie display part 33, the step display part 35, a failure line 73, and a moving object group 75. The moving object group 75 includes a plurality of marks 77 which are horizontally arranged. A mark 77L which instructs the step with the left foot, a mark 77R which instructs the step with the right foot (not shown in the figure), and a mark 77J which instructs to jump, are equipped as types of marks 77. In the example of the figure, the moving object group 75 includes three marks 77L, 77L, and 77J which are horizontally arranged.

The multimedia processor 21 moves the moving object group 75 from upper to lower toward the failure line 73. Then, the multimedia processor 21 determines that it is the failure if the moving object group 75 reaches the failure line, and then ends the item. On the other hand, the multimedia processor 21 determines that it is the success if detecting that the player 100 has performed the motions instructed by the marks 77 which are included in the moving object group 75 in order from the left side before the moving object group 75 reaches the failure line 73. In the case of the success, the multimedia processor 21 allows the moving object group 75 to where the mark 77 is added by one to appear, and then moves it down toward the failure line 73. Meanwhile, the marks may be arranged along a plurality of lines in the moving object group 75. In the example of the figure, three marks are arranged along the one line.

The multimedia processor 21 determines that it is the nonattainment if detecting that the player 100 has not performed the motions instructed by the marks 77 in order from the left side, and moves down the moving object group 75 continuously. If the nonattainment is determined, the multimedia processor 21 does not determine that it is the success until the player 100 performs the motions in order from the left side again.

Figure 10:
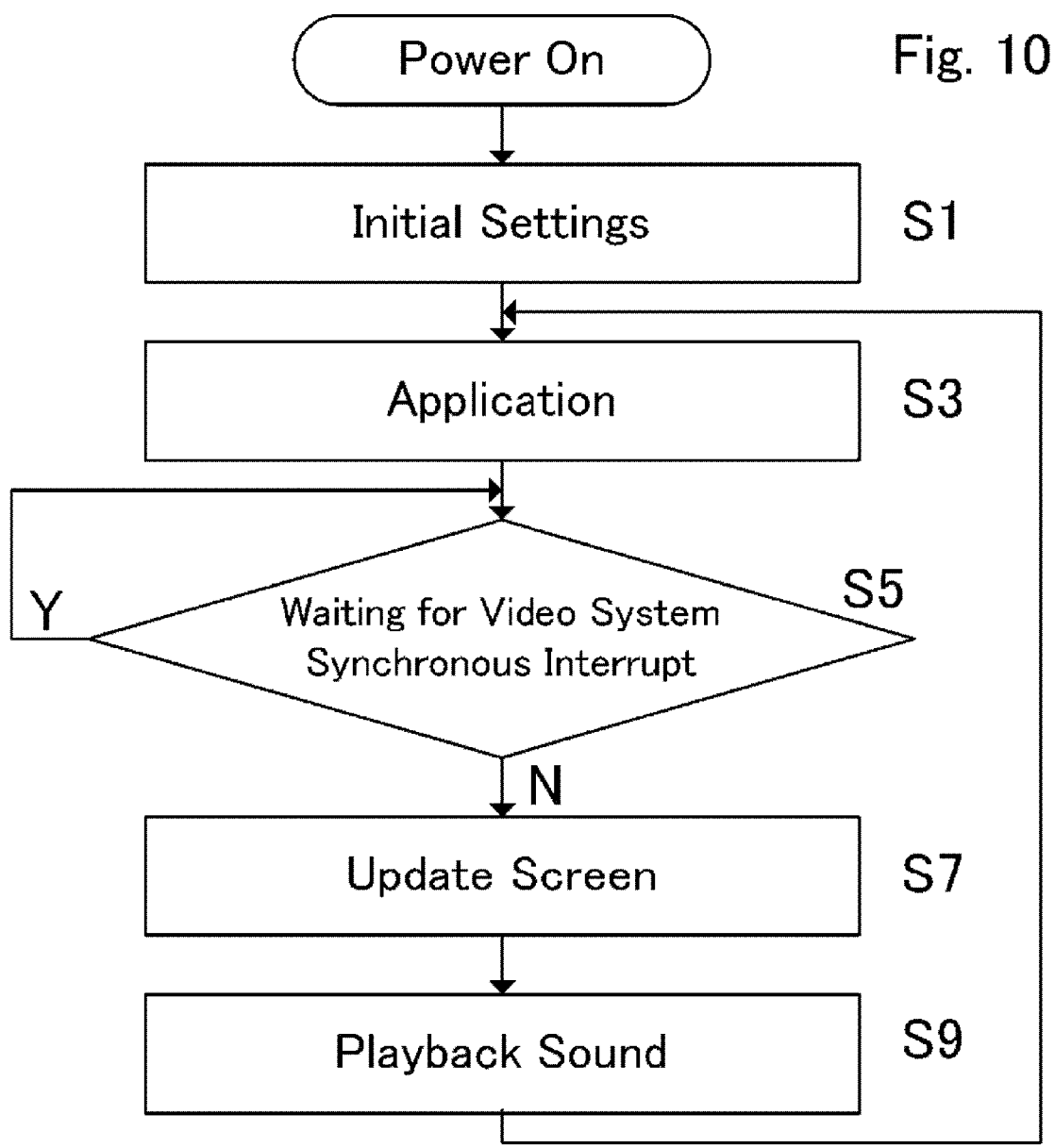
FIG. 10 is a flowchart showing the overall process flow which is executed by the multimedia processor 21 of FIG. 4.

FIG. 10 is a flowchart showing the overall process flow which is executed by the multimedia processor 21 of FIG. 4. As shown in FIG. 10, the multimedia processor 21 performs the initialization process of the system such as the initial settings of various variables (including the flags and counters) in step S1. In step S3, the multimedia processor 21 performs processing in accordance with an application program stored in the external memory 23. In step S5, the multimedia processor 21 waits until an interrupt based on a video system synchronous signal is generated. In other words, if the interrupt based on the video system synchronous signal is not generated, the processing of the multimedia processor 21 repeats the same step S5. If the interrupt based on the video system synchronous signal is generated, the processing of the multimedia processor 21 proceeds to step S7. For example, the interrupt based on the video system synchronous signal is generated at 1/60 second intervals. In step S7 and step S9, the multimedia processor 21 performs the process of updating the screen displayed on the television monitor 7 and the process of reproducing sound in synchronism with the interrupt. Then, the process of the multimedia processor 21 returns to step S3.

An application program which controls the processing of step 3 includes a plurality of programs. These programs include a program which executes the process of capturing images of the retroreflective sheets 11, a program which executes the process of extracting the target points of the retroreflective sheets 11 from a picture obtained by the image capturing, a program which executes the process of assigning the left and right to two target points as detected, a program which determines whether or not the player 100 performs the step, a program which generates the exercise support screen, and so on. Next, these processes will be explained with reference to a flow chart.

Figure 11:
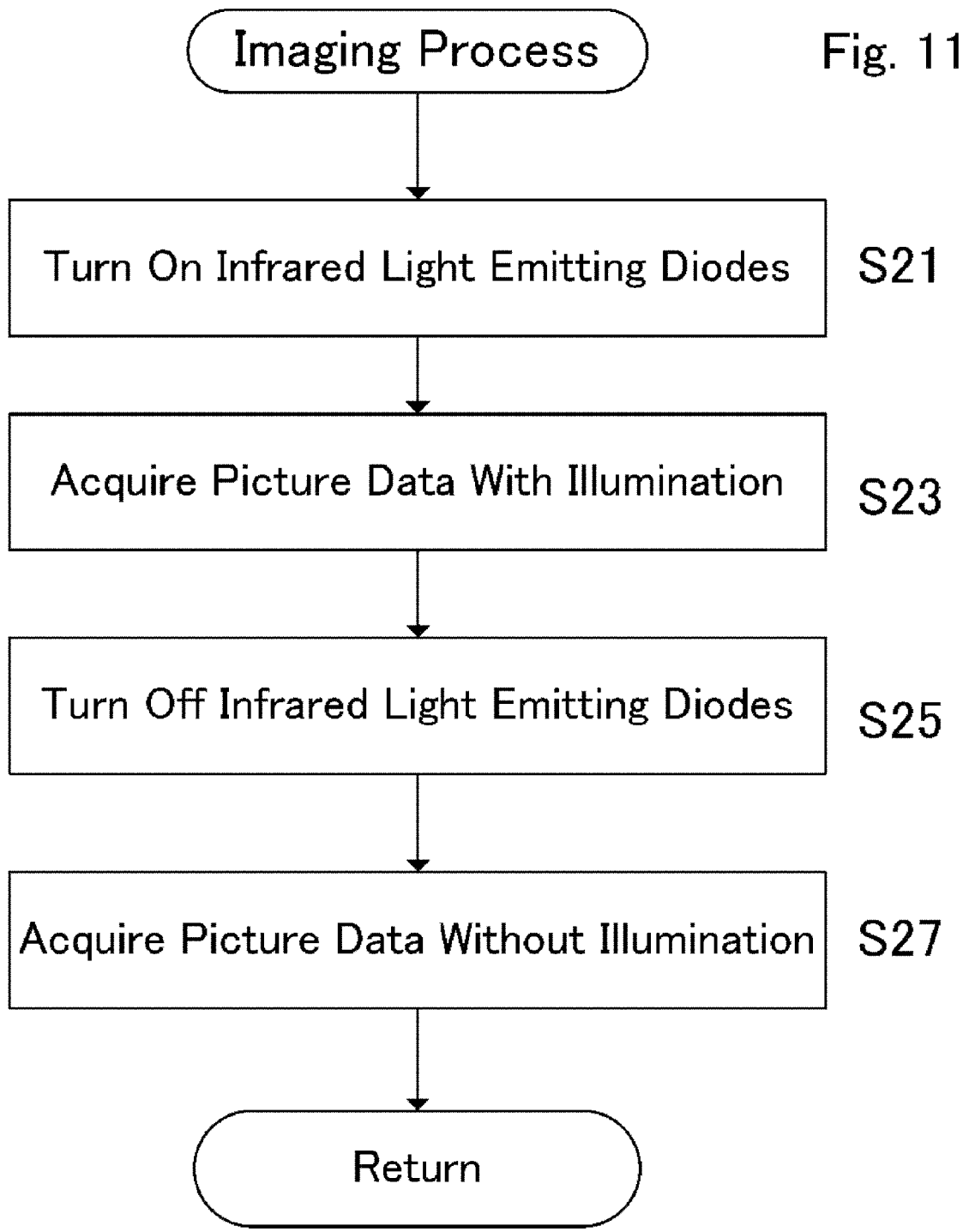
FIG. 11 is a flowchart showing the imaging process which is one of the processes of the application program of step S3 of FIG. 10.

FIG. 11 is a flowchart showing the imaging process which is one of the processes of the application program of step S3 of FIG. 10. Referring to FIG. 11, the multimedia processor 21 turns on the infrared light emitting diodes 15 in step S21. In step S23, the multimedia processor 21 acquires, from the image sensor 32, picture data which is obtained with infrared light illumination, and stores the picture data in the main RAM.

In this case, for example, a CMOS image sensor of 32 pixels×32 pixels is used as the image sensor 32 of the present embodiment. Accordingly, the image sensor 32 outputs pixel data of 32 pixels×32 pixels as picture data. This pixel data is converted into digital data by the ADC and stored in the main RAM as elements of two-dimensional array P1[X][Y].

In step S25, the multimedia processor 21 turns off the infrared light emitting diodes 15. In step S27, the multimedia processor 21 acquires, from the image sensor 32, picture data (pixel data of 32 pixels×32 pixels) which is obtained without infrared light illumination, and stores the picture data in the main RAM. In this case, the pixel data is stored in the internal main RAM as elements of two-dimensional array P2[X][Y].

In this way, the stroboscopic imaging is performed. Also, in two-dimensional coordinate system which specifies a position of each pixel constituting a picture from the image sensor 32, it is assumed that the horizontal axis is X-axis and the vertical axis is Y-axis. Also, the origin O is defined as the upper left corner of the picture. Since the image sensor 32 of 32 pixels×32 pixels is used in the case of the present embodiment, X=0 to 31 and Y=0 to 31. In this respect, the differential picture DI also is applied in the same manner. Meanwhile, the pixel data is a value of brightness.

Figure 12:
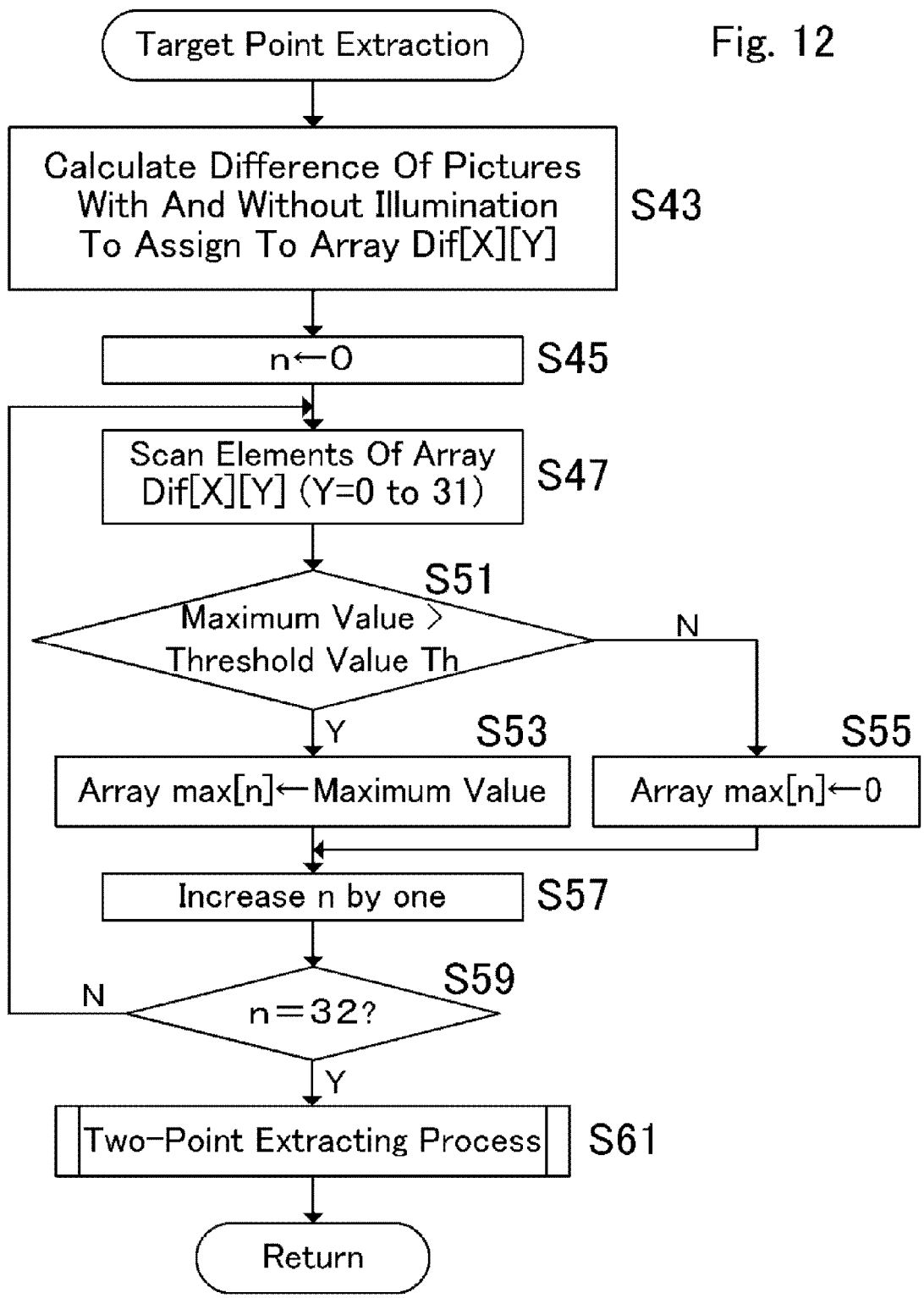
FIG. 12 is a flowchart showing the process of extracting target points which is one of the processes of the application program of step S3 of FIG. 10.

FIG. 12 is a flowchart showing the process of extracting target points which is one of the processes of the application program of step S3 of FIG. 10. Referring to FIG. 12, in step S43, the multimedia processor 21 calculates differential data between the pixel data with infrared light illumination (i.e., elements of the array P1[X][Y]) and the pixel data without infrared light illumination (i.e., elements of the array P2[X][Y]), and the differential data is assigned to two-dimensional array Dif[X][Y].

In what follows, the element of the array P1[X][Y] (i.e., the pixel data with infrared light illumination), the element of the array P2[X][Y] (i.e., the pixel data without infrared light illumination), and the element of the array Dif[X][Y] (i.e., the differential pixel data) might be referred as the pixel data P1[X][Y], the pixel data P2[X][Y], and the differential pixel data Dif[X][Y] respectively.

In step S45, the multimedia processor 21 assigns "0" to a variable "n". In step S47, the multimedia processor 21 scans the elements of the array Dif[n][0] to Dif[n][31] to find the maximum value. In step S51, the multimedia processor 21 determines whether or not the found maximum value exceeds a predetermined threshold value, and if it exceeds the processing proceeds to step S53, otherwise the processing proceeds to step S55.

In step S53, the multimedia processor 21 assigns the maximum value which exceeds the predetermined threshold value to an array max[n]. On the other hand, in step S55, the multimedia processor 21 assigns "0" to the array max[n].

In step S57 after the processing of step S53 or step S55, the multimedia processor 21 increases a valuable "n" by one. In step S59, the multimedia processor 21 determines whether or not the valuable "n" is equal to "32", and if "NO" the processing proceeds to step S47, conversely if "YES" the processing proceeds to step S61. In this way, the elements of the Dif[X][Y] of 32 pixels×32 pixels are scanned to find the maximum value to each column. Then, in step S61, the multimedia processor 21 performs the processing of extracting the target points of the retroreflective sheets 11, i.e., the two-point-extracting process.

Figure 13:
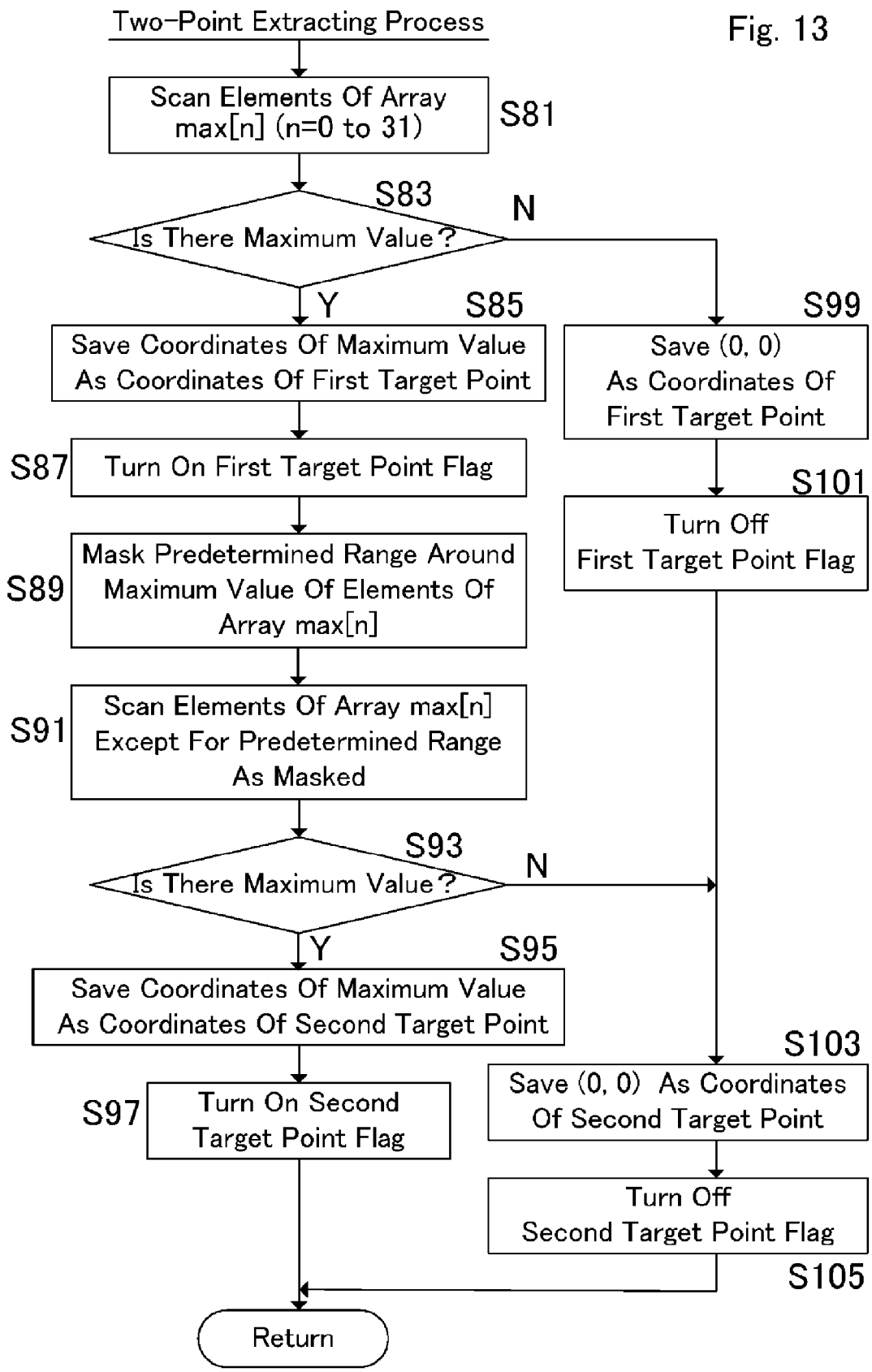
FIG. 13 is a flowchart showing the process of extracting two points in step S61 of FIG. 12.

FIG. 13 is a flowchart showing the process of extracting two points in step S61 of FIG. 12. Referring to FIG. 13, in step S81, the multimedia processor 21 scans the elements of the array max[0] to max[31] to find the maximum value. In step S83, the multimedia processor 21 proceeds to step S85 if it finds the maximum value, conversely if it does not find it the processing proceeds to step S99.

In step S85, the multimedia processor 21 saves the coordinates of the found maximum value as the coordinates of a first target point. Then, in step S87, the multimedia processor 21 turns on a first target point flag which indicates presence of the first target point.

In step S89, the multimedia processor 21 masks a predetermined range around the maximum value found in step S81, of the elements of the array max[0] to max[31]. Then, in step S91, the multimedia processor 21 scans the elements of the array max[0] to max[31] except for the predetermined range as masked, and finds the maximum value among them.

In step S93, the multimedia processor 21 proceeds to step S95 if it finds the maximum value, conversely if it does not find it the processing proceeds to step S103. In step S95, the multimedia processor 21 saves the coordinates of the maximum value as found in step S91 as the coordinates of a second target point. Then, in step S97, the multimedia processor 21 turns on a second target point flag which indicates presence of the second target point.

On the other hand, after the determination in step S83 is "NO", in step S99, the multimedia processor 21 saves the coordinates (0, 0) as the coordinates of the first target point. Then, in step S101, the multimedia processor 21 turns off the first target point flag.

Also, after step S101 or after the determination in step S93 is "NO", in step S103, the multimedia processor 21 saves the coordinates (0, 0) as the coordinates of the second target point. Then, in step S105, the multimedia processor 21 turns off the second target point flag.

Just after the two-point extracting process of FIG. 13 is completed, it can not be determined that which of the first target point and the second target point is the target point of the retroreflective sheet 11 of the left leg or the target point of the retroreflective sheet 11 of the right leg. Therefore, the next processing of determining left and right is executed in order to assign the left and right to the first target point and the second target point.

Figure 14:
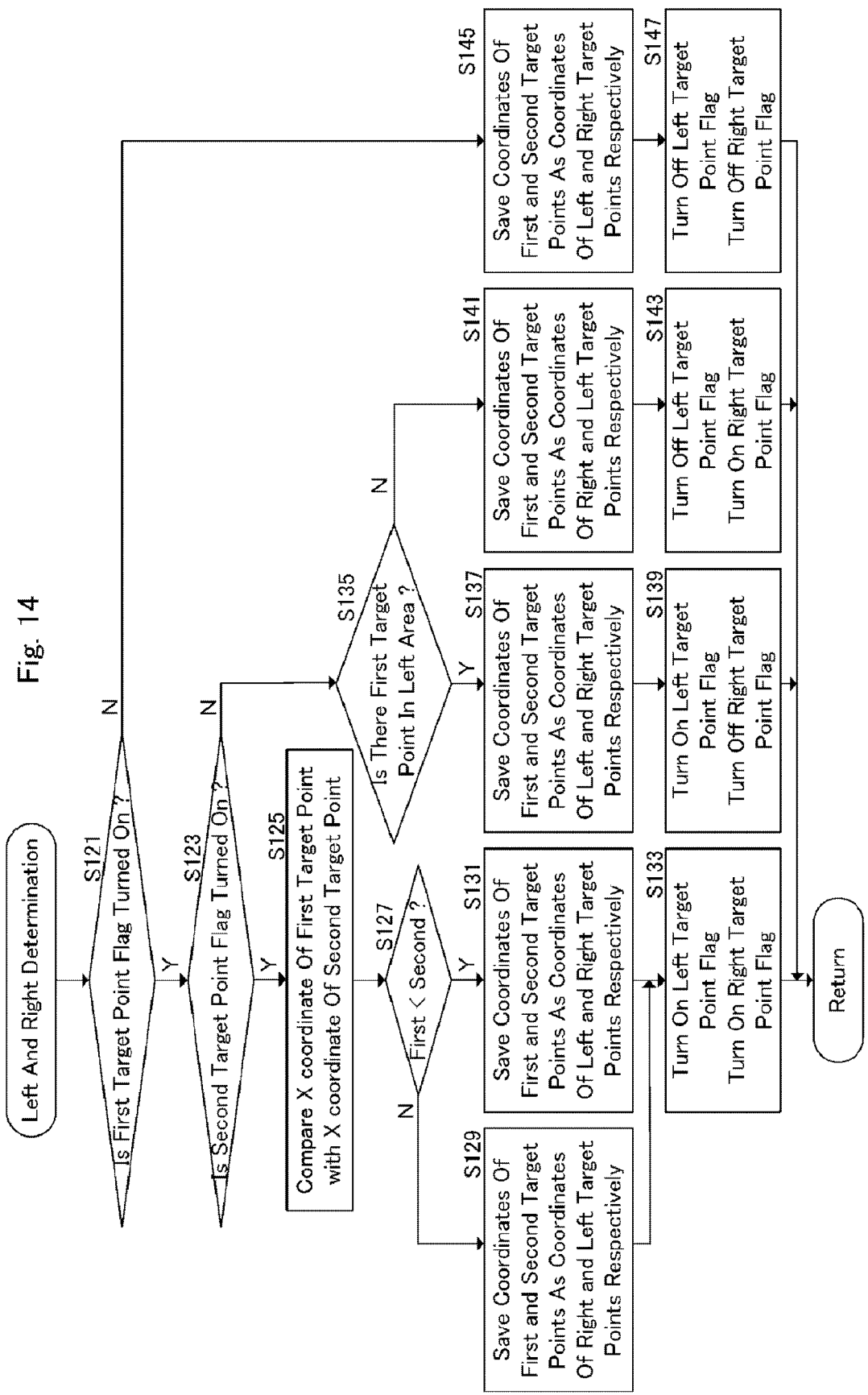
FIG. 14 is a flowchart showing the process of determining left and right which is one of the processes of the application program of step S3 of FIG. 10.

FIG. 14 is a flowchart showing the process of determining left and right which is one of the processes of the application program of step S3 of FIG. 10. Referring to FIG. 14, in step S121, the multimedia processor 21 checks whether or not the first target point flag is turned on, and if it is turned on the processing proceeds to step S123 because of the presence of the first target point, conversely, if it is turned off the processing proceeds to step S145 because of the absence of the first target point.

In the case where the first target point does not exist, since the second target point does not exist also, the multimedia processor 21 saves the coordinates of the first target point and the coordinates of the second target point as the coordinates of a left target point and the coordinates of a right target point respectively in step S145, and then turns off a left target point flag and a right target point flag in step S147. In this case, the left target point means the target point of the retroreflective sheet 11 as worn on the left leg and the right target point means the target point of the retroreflective sheet 11 as worn on the right leg. Also, the left target point flag is turned on if the left target point exists and the right target point flag is turned on if the right target point exists.

After the determination in step S121 is "YES", in step S123, the multimedia processor 21 determines weather or not the second target point flag is turned on, and if it is turned on the process proceeds to step S125 because of the presence of the second target point, conversely, if it is turned off the process proceeds to step S135 because of the absence of the second target point.

In the case where "NO" is determined in step S123, only the first target point exists, therefore the multimedia processor 21 determines whether or not the first target point exists in the left-half area of the picture obtained by the image capturing in order to assign either the left target point or the right target point to the first target point in step S135. In the case where the first target point exists in the left-half area of the picture obtained by the image capturing, the multimedia processor 21 saves the coordinates of the first target point and the second target point as the coordinates of the left target point and the right target point respectively in order to assign the left target point to the first target point in step S137, and then the left target point flag is turned on and the right target point flag is turned off in step S139. On the other hand, in the case where the first target point does not exist in the left-half area of the picture obtained by the image capturing, i.e., it exists in the right-half area, the multimedia processor 21 saves the coordinates of the first target point and the second target point as the coordinates of the right target point and the left target point respectively in order to assign the right target point to the first target point in step S141, and then the left target point flag is turned off and the right target point flag is turned on in step S143.

In the case where "YES" is determined in step S123, both the first target point and the second target point exist, therefore the multimedia processor 21 compares the X coordinate of the first target point with the X coordinate of the second target point in order to determine which of them is the left target point or the right target point in step S125.

In step S127, if the X coordinate of the first target point is less than the X coordinate of the second target point, i.e., the first target point is located in the left side of the second target point, the processing of the multimedia processor 21 proceeds to step S131, otherwise, i.e., if the first target point is located in the right side of the second target point, the processing proceeds to step S129.

In the case where "YES" is determined in step S127, the multimedia processor 21 saves the coordinates of the first target point and the second target point as the coordinates of the left target point and the right target point respectively in order to assign the left target point and the right target point to the first target point and the second target point respectively in step S131, and then the left target point flag and the right target point flag are turned on in step S133.

On the other hand, in the case where "NO" is determined in step S127, the multimedia processor 21 saves the coordinates of the first target point and the second target point as the coordinates of the right target point and the left target point respectively in order to assign the right target point and the left target point to the first target point and the second target point respectively in step S129, and then the left target point flag and the right target point flag are turned on in step S133.

After the process of determining left and right of FIG. 14, next, the multimedia processor 21 executes the step determining process in order to determine whether or not the player 100 performs the step.

Figure 15:
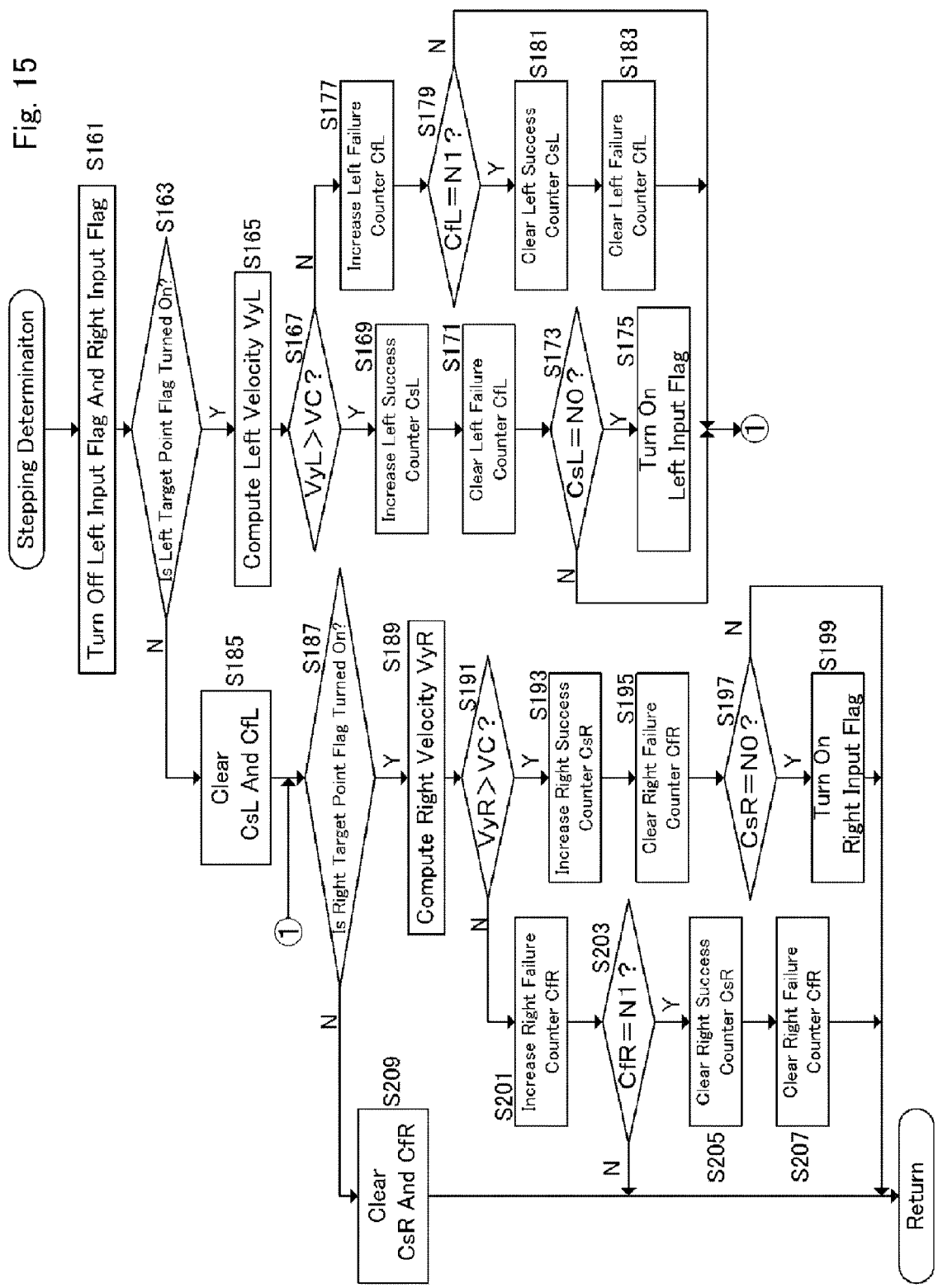
FIG. 15 is a flowchart showing the step determining process which is one of the processes of the application program of step S3 of FIG. 10.

FIG. 15 is a flowchart showing the step determining process which is one of the processes of the application program of step S3 of FIG. 10. Referring to FIG. 15, in step S161, the multimedia processor 21 turns off a left input flag and a right input flag. The left input flag is turned on when the step with the left foot is detected and the right input flag is turned on when the step with the right foot is detected. These flags are cleared at each time of update of the video frame by this step S161.

In step S163, the multimedia processor 21 checks whether or not the left target point flag is turned on, and if it is turned on the processing proceeds to step S165 in order to determine whether or not there is the left step, conversely if it is turned off the processing proceeds to step S185. In step S165, the multimedia processor 21 computes the velocity VyL of the left target point in the Y-axis direction on the basis of the present and previous Y coordinates of the left target point. In step S167, the multimedia processor 21 determines whether or not the left velocity VyL exceeds a predetermined value VC (>0), and if it exceeds the process proceeds to step S169, otherwise the process proceeds to step S177. Meanwhile, in the case where the left velocity VyL exceeds the predetermined value VC (>0), it means that the retroreflective sheet 11 of the left leg moves down vertically because the positive direction of the Y-axis faces down vertically.

In step S169, the multimedia processor 21 increases a left-success counter CsL by one. In step S171, the multimedia processor 21 clears a left-failure counter CfL. Then, in step S173, the multimedia processor 21 determines whether or not the left-success counter CsL is equal to a constant N0 (an integer which is two or more), and if it is equal the process proceeds to step S175, otherwise the process proceeds to step S187 in order to determine whether or not there is the right step.

After the determination in step S173 is "YES", in step S175, the multimedia processor 21 turns on the left input flag and then proceeds to step S187.

After the determination in step S167 is "NO", in step S177, the multimedia processor 21 increases the left-failure counter CfL by one. Then, in step S179, the multimedia processor 21 determines whether or not the left-failure counter CfL is equal to a constant N1 (an integer which is two or more), and if it is equal the process proceeds to step S181, otherwise the process proceeds to step S187 in order to determine whether or not there is the right step. In step S181, the multimedia processor 21 clears the left-success counter CsL. Then, in step S183, the multimedia processor 21 clears the left-failure counter CfL and then proceeds to step S187.

As described above, if the left-success counter CsL reaches the constant N0 (step S173) before the left-failure counter CfL is equal to the constant N1 (step S179), it is determined that the left step is performed (step S175). Accordingly, it is not necessarily required that the left velocity VyL exceeds the predetermined value VC N0 times consecutively. However, if the left velocity VyL is less than or equal to the predetermined value VC N1 times consecutively, the left-success counter CsL is cleared (step S171 and S181).

After the determination in step S163 is "NO", in step S185, the multimedia processor 21 clears the left-success counter CsL and the left-failure counter CfL, and then proceeds to step S187 in order to determine whether or not there is the right step.

In step S187, the multimedia processor 21 determines whether or not the right target point flag is turned on, and if it is turned on the process proceeds to step S189, conversely if it is turned off the process proceeds to step S209. In step S189, the multimedia processor 21 computes a velocity VyR of the right target point in the Y-axis direction on the basis of the present and previous Y coordinates of the right target point. In step S191, the multimedia processor 21 determines whether or not the right velocity VyR exceeds the predetermined value VC (>0), and if it exceeds the process proceeds to step S193, otherwise the process proceeds to step S201. Meanwhile, in the case where the right velocity VyR exceeds the predetermined value VC (>0), it means that the retroreflective sheet 11 of the right leg moves down vertically because the positive direction of the Y-axis faces down vertically.

In step S193, the multimedia processor 21 increases the right-success counter CsR by one. In step S195, the multimedia processor 21 clears the right-failure counter CfR. Then, in step S197, the multimedia processor 21 determines whether or not the right-success counter CsR is equal to the constant N0 (an integer which is two or more), and if it is equal the process proceeds to step S199, otherwise the process returns.

After the determination in step S191 is "NO", in step S201, the multimedia processor 21 increases the right-failure counter CfR by one. Then, in step S203, the multimedia processor 21 determines whether or not the right-failure counter CfR is equal to the constant N1 (an integer which is two or more), and if it is equal the process proceeds to step S205, otherwise the process returns. In step S205, the multimedia processor 21 clears the right-success counter CsR. Then, in step S207, the multimedia processor 21 clears the right-failure counter CfR and then returns.

As described above, if the right-success counter CsR reaches the constant N0 (step S197) before the right-failure counter CfR is equal to the constant N1 (step S203), it is determined that the right step is performed (step S199). Accordingly, it is not necessarily required that the right velocity VyR exceeds the predetermined value VC N0 times consecutively. However, if the right velocity VyR is less than or equal to the predetermined value VC N1 times consecutively, the right-success counter CsR is cleared (step S195 and S205).

After the determination in step S187 is "NO", in step S209, the multimedia processor 21 clears the right-success counter CsR and the right-failure counter CfR, and then returns.

After the step determining process of FIG. 15, next, the multimedia processor 21 executes the jump determining process in order to determine whether or not the player 100 performs the jump.

Figure 16:
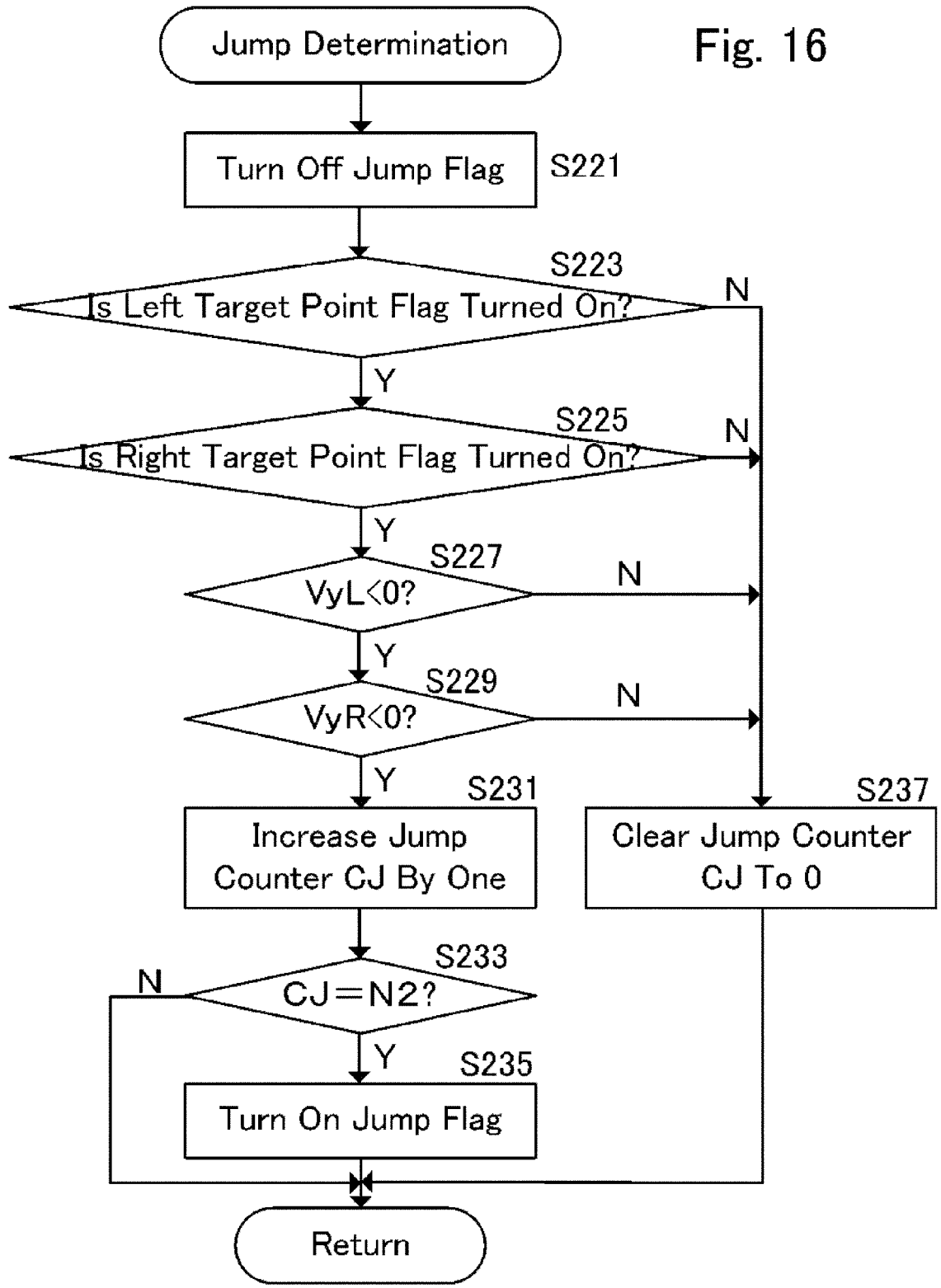
FIG. 16 is a flowchart showing the jump determining process which is one of the processes of the application program of step S3 of FIG. 10.

FIG. 16 is a flowchart showing the jump determining process which is one of the processes of the application program of step S3 of FIG. 10. Referring to FIG. 16, in step S221, the multimedia processor 21 turns off a jump flag. The jump flag is the flag which is turned on when determining that the player 100 jumps. This flag is cleared at each time of update of the video frame by this step S221.

In step S223, the multimedia processor 21 determines whether or not the left target point flag is turned on, and if it is turned on the processing proceeds to step S225, conversely if it is turned off the processing proceeds to step S237. In step S225, the multimedia processor 21 determines whether or not the right target point flag is turned on, and if it is turned on the processing proceeds to step S227, conversely if it is turned off the processing proceeds to step S237.

In step S227, the multimedia processor 21 determines whether or not the left velocity VyL is less than "0", and if it is less than "0" the process proceeds to step S229, otherwise the process proceeds to step S237. In step S229, the multimedia processor 21 determines whether or not the right velocity VyR is less than "0", and if it is less than "0" the process proceeds to step S231, otherwise the process proceeds to step S237.

Meanwhile, in the case where the left velocity VyL is negative, it means that the retroreflective sheet 11 of the left leg moves up vertically because the positive direction of the Y-axis faces down vertically. In the similar way, in the case where the right velocity VyR is negative, it means that the retroreflective sheet 11 of the right leg moves up vertically.

In step S231, the multimedia processor 21 increases a jump counter by one. In step S233, the multimedia processor 21 determines whether or not the jump counter CJ is equal to a constant N2 (an integer which is two or more), and if it is equal the process proceeds to step S235, otherwise the process returns. In step S235, the multimedia processor 21 turns on the jump flag.

After the determination in step S223, S225, S227, or S229 is "NO", in step S237, the multimedia processor 21 clears the jump counter CJ to "0".

As described above, the condition for determining the jump is that a state occurs N2 times consecutively. The state is a state that the both left target point and the right target point move up vertically.

Figure 17:
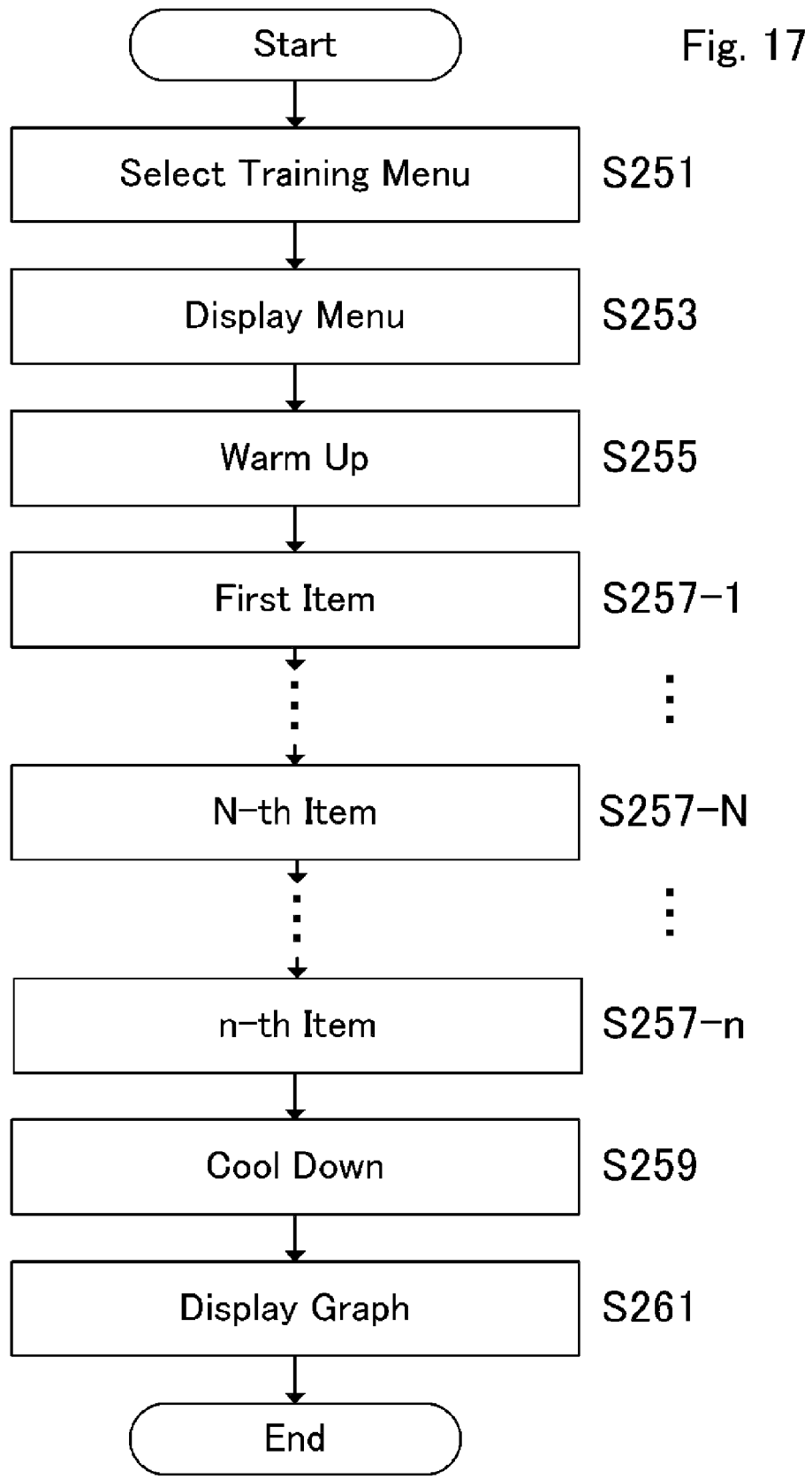
FIG. 17 is a state transition diagram showing the exercise supporting process which is executed by the multimedia processor 21 of FIG. 4.

FIG. 17 is a state transition diagram showing the exercise supporting process which is executed by the multimedia processor 21 of FIG. 4. Referring to FIG. 17, in step S251, the multimedia processor 21 selects a menu which is performed on the day from multiple kinds of menus based on the date information of RTC 29. In step S253, the multimedia processor 21 displays the menu selected in step S251 on the television monitor 7.

Meanwhile, in the present embodiment, five items are provided corresponding to the FIG. 5 to FIG. 9. Also, a warm-up and a cool-down are not included in the number of items. Arbitrary n items among the five items, which are located between the warm-up and the cool-down, are registered in each menu. The n is an integer which is one or more, the maximum value thereof is five, and the n is independently set to each menu. Each of the first item to the n-th item as registered in the menu is generally referred as the N-th item.

In step S255, the multimedia processor 21 displays a screen for warming up in accordance with the menu as selected on the television monitor 7. After the completion of processing for warming up, in step S257-N, the multimedia processor 21 displays a screen corresponding to the N-th item on the television monitor 7 in accordance with the selected menu. After the completion of processing with regard to N-th item, in step S257-(N+1), the multimedia processor 21 displays a screen corresponding to the N+1-th item on the television monitor 7 in accordance with the selected menu. In this way, the multimedia processor 21 executes the items included in the selected menu sequentially from the first item to the n-th item.

After the completion of processing with regard to n-th item, in step S259, the multimedia processor 21 displays a screen for cooling down on the television monitor 7. Then, after the processing for cooling down, in step S261, the multimedia processor 21 displays a graph and ends the processing. However, before the end of the processing, the multimedia processor 21 saves the total exercise time on the day, the total number of steps on the day, and the total calories on the day in association with the date in EEPROM 27.

Meanwhile, though the flow of the exercise supporting processing of the multimedia processor 21 is described by referring to the state transition diagram because of easiness in the comprehension, the processing of FIG. 17 is executed as the processing of the application program in step S3 as shown in FIG. 10.

Next, a flow of each item is described below. While these processes also is executed as the process of the application program which is executed in step S3 of FIG. 10, for the sake of clarity in explanation, the explanation is made with reference to a flowchart of form included in the transition diagram of FIG. 17 instead of the flowchart of form synchronized with a video system synchronous signal.

Figure 18:
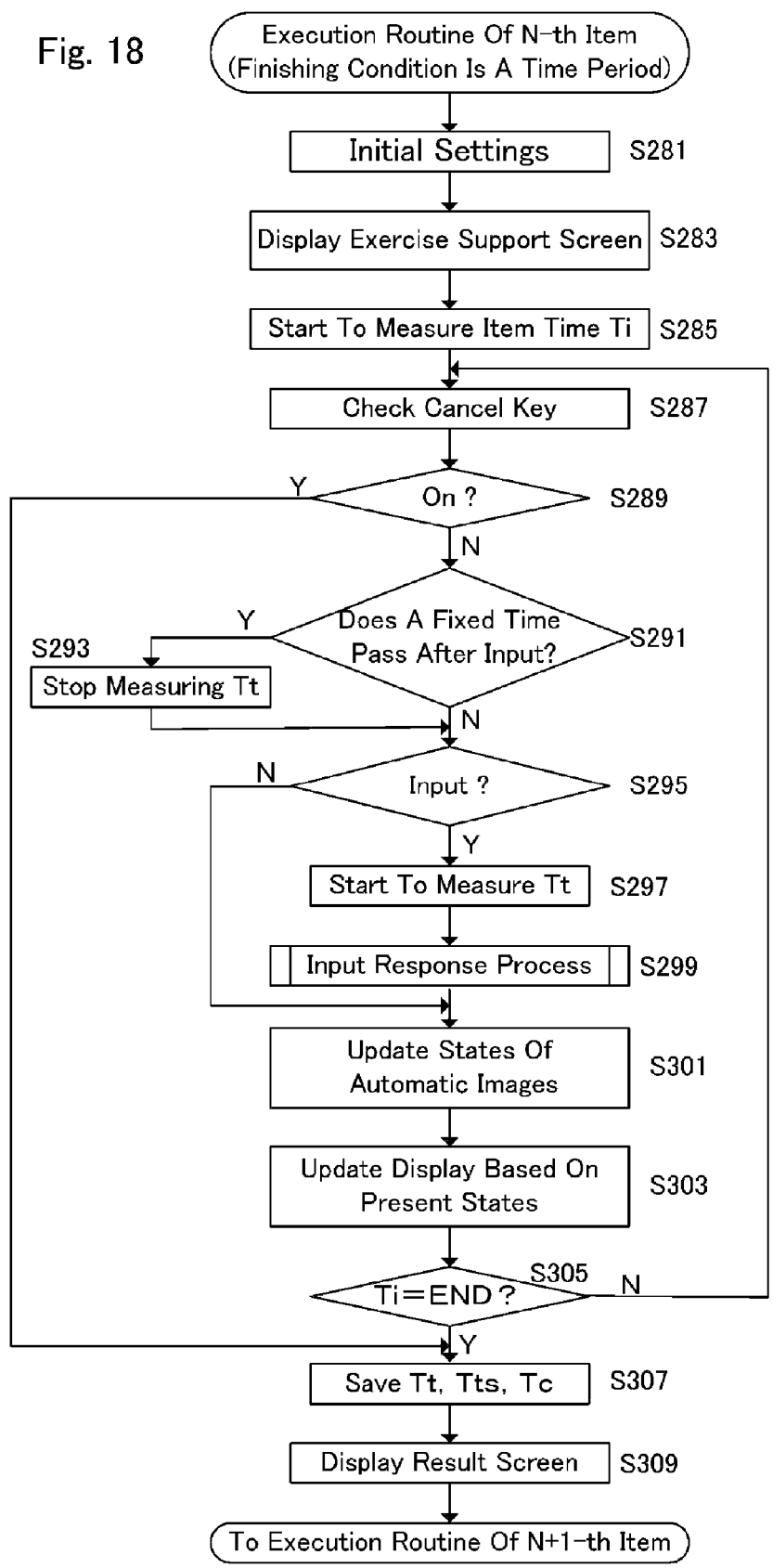
FIG. 18 is a flowchart showing the execution routine corresponding to the N-th item in step S257-N of FIG. 17 (a finishing condition is a time period).

FIG. 18 is a flowchart showing the execution routine corresponding to the N-th item in step S257-N of FIG. 17 (a finishing condition is a time period). The items whose finishing conditions are a time period are the items corresponding to FIG. 5 to FIG. 7. FIG. 18 shows the processing of the item corresponding to FIG. 5.

Referring to FIG. 18, in step S281, the multimedia processor 21 performs the initialization process for executing the routine. In step S283, the multimedia processor 21 displays the exercise support screen of FIG. 5 on the television monitor 7. In step S285, the multimedia processor 21 starts to measure an item time Ti. The item time Ti is an elapsed time of the item and is displayed on the time display part 41.

In step S287, the multimedia processor 21 checks the cancel key 28 of the adaptor 3 (refer to FIG. 1). In step S289, the multimedia processor 21 proceeds to step S307 if the cancel key is turned on. Accordingly, in the case where the cancel key 28 is depressed, this item is skipped. On the other hand, in the case where the cancel key 28 is turned off, the multimedia processor 21 proceeds to step S291.

In step S291, the multimedia processor 21 determines whether or not a fixed time passes after a latest input, and if it does not pass the processing proceeds to step S295, conversely if it passes the processing proceeds to step S293. In this case, the input means that any one of the left input flag (step S175), the right input flag (step S199), and the jump flag (step S235) is turned on. In step S293, the multimedia processor 21 stops measuring a total time Tt and proceeds to step S295. The total time Tt represents the accumulation of the exercise time on the day and is displayed on the time display part 31.

In step S295, the multimedia processor 21 checks the right input flag, the left input flag, and the jump flag (refer to FIG. 15 and FIG. 16), and if any one of them is turned on (the presence of the input) the process proceeds to step S297, otherwise, i.e., the process proceeds to step S301 if all of the right input flag, the left input flag, and the jump flag are turned off (the absence of the input).

In the case where the measurement of the total time Tt is stopped, the multimedia processor 21 starts to measure it in step S297. In step S299, the multimedia processor 21 performs the predetermined processing in response to the input by the player (the left step, the right step, or the jump).

Figure 19:
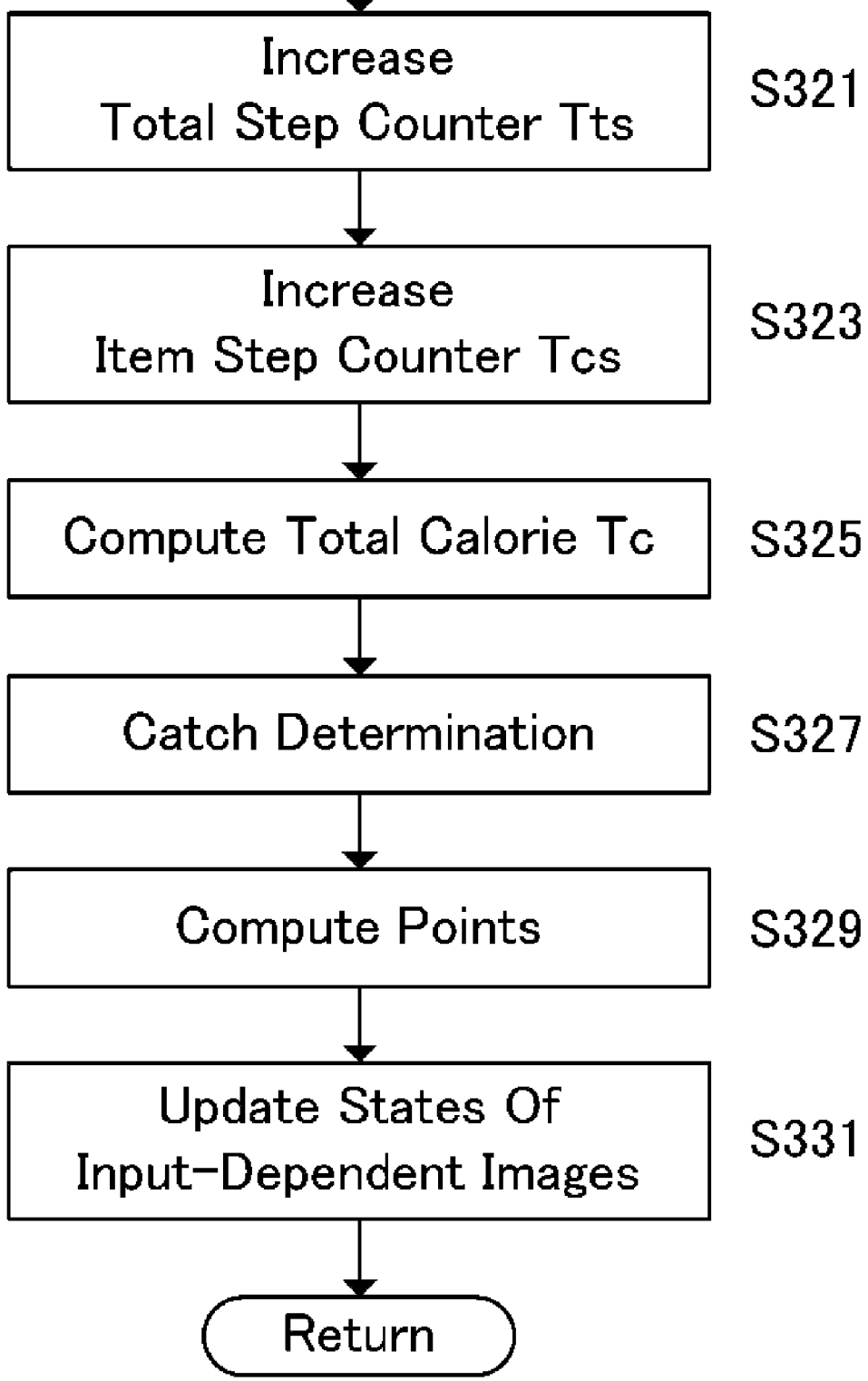
FIG. 19 is a flowchart showing the input responding process of step S299 of FIG. 18.

FIG. 19 is a flowchart showing the input responding process of step S299 of FIG. 18. This process is executed corresponding to the item of the FIG. 5. Referring to FIG. 19, in step S321, the multimedia processor 21 increases a total step counter Tts. The total step counter Tts represents the accumulation of the number of steps on the day. The multimedia processor 21 increases it by two if the jump flag is turned on and increases it by one if either the left input flag or the right flag is turned on.

In step S323, the multimedia processor 21 increases an item step counter Tcs. The item step counter Tcs represents the accumulation of the number of steps in the item which is being executed. The multimedia processor 21 increases it by two if the jump flag is turned on and increases it by one if either the left input flag or the right flag is turned on.

In step S325, the multimedia processor 21 computes the total calorie Tc (=Tts*W*U) on the basis of the value of the total step counter Tts, the weight W of the user (kg), and the value U of a unit calorie consumption (kcal/kg*step). In step S327, the multimedia processor 21 determines whether or not the operation object 47 catches the moving object 49. In this case, it is determined that it is caught if the horizontal coordinate of the center of the moving object 49 is located within a predetermined horizontal range around the horizontal coordinate of the center of the operation object 47 while the vertical coordinate of the center of the moving object 49 is located within a predetermined vertical range around the vertical coordinate of the upper end of the operation object 47. In step S329, the multimedia processor 21 computes points displayed on the score display part 45.

In step S331, the multimedia processor 21 updates states of various images (coordinates, image data, and so on) which changes and/or appears in dependence on the input by the player 100. In the case of the item of FIG. 5, the images which depend on the input are the operation object 47, the calorie display part 33, the step display part 35, and the score display part 45.

Returning to FIG. 18, in step S301, the multimedia processor 21 updates the states of various images (coordinates, image data, and so on) which do not depend on the input by the player, i.e., change and/or appear automatically (by a program). In the case of the item of FIG. 5, the automatic images are the moving object 49, the time display part 41, and the time display part 31. However, the time display part 31 is not fully automatic and therefore depends on the input partially because it stops when there is no input for a fixed time (step S293).

In step S303, the multimedia processor 21 updates the display based on the present states of the various images. In step S305, the multimedia processor 21 determines whether or not the item time Ti is equal to a predetermined time END, and if it is equal the processing proceeds to step S307 in order to end the processing of this item, conversely if it is not equal the processing returns to step S287. In step S307, the multimedia processor 21 stores the total time Tt, the value of the total step counter Tts, and the total calorie Tc in the main RAM. In step S309, the multimedia processor 21 displays a result screen and then proceeds to the execution routine corresponding to the next item.

By the way, the item of FIG. 6 and the item of the FIG. 7 common with the item of FIG. 5 because the finishing condition is a time period. Therefore, the processing is executed in a manner similar to the processing as shown in FIG. 18 and FIG. 19. However, in step S285 of the item of FIG. 6, the count-down operation from 10 seconds is performed instead of measuring the item time Ti to display it on the time display part 37, and the value of the item step counter Tcs is displayed on the step display part 39. The state of the time display part 37 is updated in step S301 and the state of the step display part 39 is updated in step S331. The step S327 and S329 are not performed.

Also, in step S327 of the item of FIG. 7, it is determined whether or not the player character 61 skips successfully without being caught by the skipping rope 63 (a success determination process) instead of the catch determination. In addition, in step S329, the processing of counting the consecutive success frequency to be displayed on the continuous number-of-times display part 59 and the processing of counting the total success frequency to be displayed on the total number-of-times display part 57 are performed instead of computing points. The total number-of-times display part 57, the continuous number-of-times display part 59, and the state of the player character 61 are updated in step S331. The states of the skipping rope 63 and the time display part 53 are updated in step S301. However, the skipping rope 63 is not fully automatic and therefore depends on the input partially because the image of the skipping rope 63 which represents failure is displayed when the failure is determined in the success determination process. Also, the item time Ti is displayed on the time display part 53.

Figure 20:
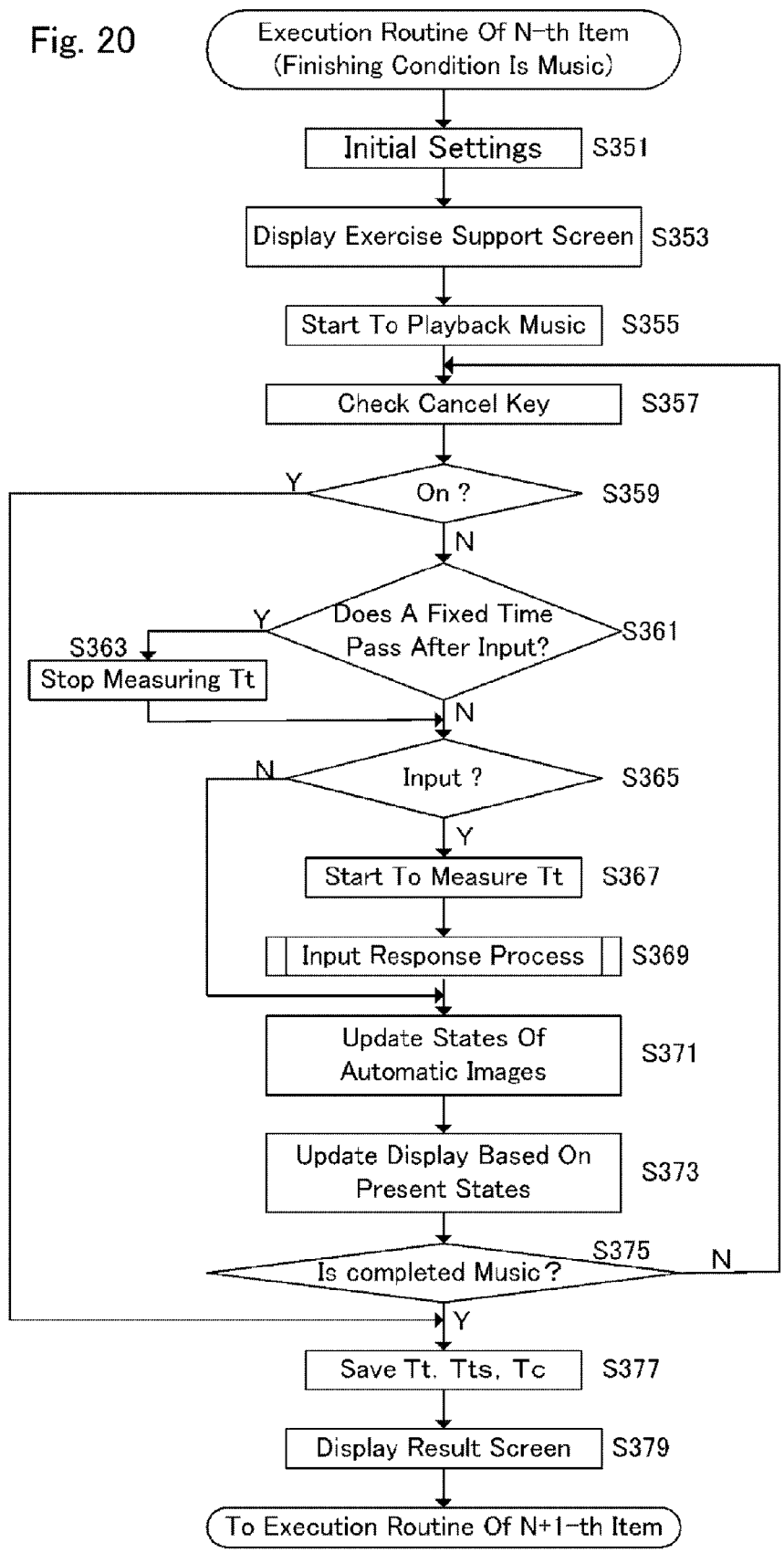
FIG. 20 is a flowchart showing the execution routine corresponding to the N-th item in step S257-N of FIG. 17 (a finishing condition is completion of music).

FIG. 20 is a flowchart showing the execution routine corresponding to the N-th item in step S257-N of FIG. 17 (a finishing condition is completion of music). The item whose finishing condition is music is the item corresponding to the item of FIG. 8. Referring to FIG. 20, in step S351, the multimedia processor 21 performs the initialization process for executing the routine. In step S353, the multimedia processor 21 displays the exercise support screen of FIG. 8 on the television monitor 7. In step S355, the multimedia processor 21 starts to playback music.

The processes in step S357, S359, S361, S363, S365, S367, and S369 are same as step S287, S289, S291, S293, S295, S297 and S299 of FIG. 18 respectively and therefore redundant explanation is not repeated. However, in step S327 of the input responding process of FIG. 19, the processing of determining either "EXCELLENCE" or "GOOD" is executed instead of the catch determination process. Also, in step S329, the processing of counting is performed in order to display it on the evaluation display part 65. The state of the evaluation display part 65 is updated in step S331.

Returning to FIG. 20, in step S371, the multimedia processor 21 updates the states of various images (coordinates, image data, and so on) which do not depend on the input by the player, i.e., change and/or appear automatically (by a program). In the case of the item of FIG. 8, the automatic images are the circle 71 and the gauge 67.

In step S373, the multimedia processor 21 updates the display based on the present states of the various images. In step S375, the multimedia processor 21 determines whether or not the music ends, and if it ends the processing proceeds to step S377 in order to end the processing of this item, conversely if it does not end the processing returns to step S357. In step S377, the multimedia processor 21 stores the total time Tt, the value of the total step counter Tts, and the total calorie Tc in the main RAM. In step S379, the multimedia processor 21 displays a result screen and then proceeds to the execution routine corresponding to the next item.

Figure 21:
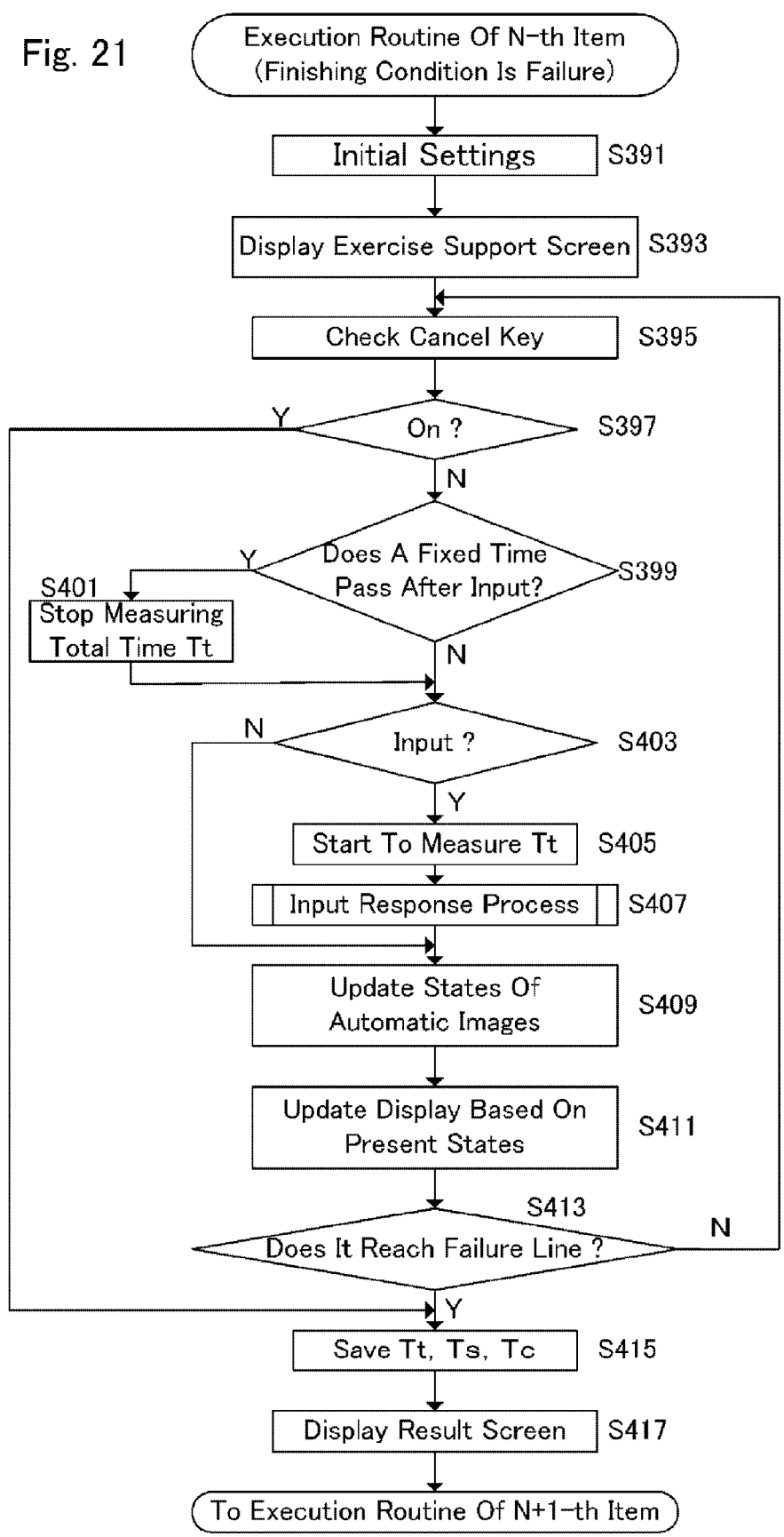
FIG. 21 is a flowchart showing the execution routine corresponding to the N-th item in step S257-N of FIG. 17 (a finishing condition is a failure).

FIG. 21 is a flowchart showing the execution routine corresponding to the N-th item in step S257-N of FIG. 17 (a finishing condition is a failure). The item whose finishing condition is the failure is the item corresponding to the item of FIG. 9. Referring to FIG. 21, in step S391, the multimedia processor 21 performs the initialization process for executing the routine. In step S393, the multimedia processor 21 displays the exercise support screen of FIG. 9 on the television monitor 7.

The processes in step S395, S397, S399, S401, S403, S405, and S407 are same as step S287, S289, S291, S293, S295, S297 and S299 of FIG. 18 respectively and therefore redundant explanation is not repeated. However, in step S327 of the input responding process of FIG. 19, the processing of determining whether or not the player 100 inputs in accordance with the instructions of the moving object group 75 is executed instead of the catch determination process.

Returning to FIG. 21, in step S409, the multimedia processor 21 updates the states of various images (coordinates, image data, and so on) which do not depend on the input by the player, i.e., change and/or appear automatically (by a program). In the case of the item of FIG. 9, the automatic images are the respective mark 77 of the moving object group 75. However, the mark 77 is not fully automatic and therefore depends on the input partially because it disappears when the input follows the instruction.

In step S411, the multimedia processor 21 updates the display based on the present states of the various images. In step S413, the multimedia processor 21 determines whether or not the mark 77 reaches the failure line 73, and if it reaches the processing proceeds to step S415 in order to end the processing of this item, conversely if it does not reach the processing returns to step S395. In step S415, the multimedia processor 21 stores the total time Tt, the value of the total step counter Tts, and the total calorie Tc in the main RAM. In step S417, the multimedia processor 21 displays a result screen and then proceeds to the execution routine corresponding to the next item.

By the way, in the case of the present embodiment as has been discussed above, in addition to a guide of stepping, since the motions of retroreflective sheets 11 worn on both legs, i.e., the motions of both legs of the player 100 are reflected in a video image, it is possible to provide the interactive exercise support system. Accordingly, since the response to stepping is returned, it is possible to add amusingness to monotonous stepping, and thereby it is possible to support the continuance of the stepping exercise. In addition, since a special exercise machine is not required and it is enough that the retroreflective sheets 11 are only worn on the legs, it is possible to reduce an economical burden of the user and realize the space saving.

Further, since the player 100 wears the retroreflective sheets 11 on both legs and the multimedia processor 21 analyzes the respective motions of the both legs, it is possible to provide many more exercise items in comparison with a case of analyzing only motion of one leg. Namely, in a case of analyzing only motion of one leg, step is detectable but jump is undetectable. On the other hand, in a case of analyzing motions of both legs, jump is detectable in addition to step. Therefore, it is possible to add an item that instructs the player 100 to jump.

Also, in the case of the present embodiment, since the retroreflective sheets 11 are worn just under the knees, in the case where the adapter 3, in which the cartridge 1 including the imaging unit 17 is inserted, is placed on a floor and the player 100 performs the stepping action, it is more certainly possible to capture images of the retroreflective sheets 11 worn on both legs in any state.

Meanwhile, the present invention is not limited to the above embodiments, and a variety of variations and modifications may be effected without departing from the spirit and scope thereof, as described in the following exemplary modifications.

(1) As described above, though the retroreflective sheets 11 are worn on the both legs of the player 100 in order to be easy to detect, it is not necessarily required to wear the retroreflective sheets 11 dependently on power of the image sensor 32 and the multimedia processor 21. If it is possible to analyze the motions of the both legs of the player 100, the retroreflective sheets 11 are not necessarily absolute.

(2) As described above, while the type where the cartridge 1 is inserted in the adapter 3 is applied, these may be integrally constituted.

(3) As described above, while a display device is the television monitor 7, the display device is not limited thereto.

While the present invention has been described in terms of embodiments, it is apparent to those skilled in the art that the invention is not limited to the embodiments as described in the present specification. The present invention can be practiced with modification and alteration within the spirit and scope which are defined by the appended claims.

What is claimed is:

1. An exercise support device comprising:
    an image generating unit operable to generate an image which guides stepping action of a player;
    an imaging unit operable to capture an image of a first reflecting member worn on a left leg of the player and an image of a second reflecting member worn on a right leg of the player;
    a detecting unit operable to detect the first reflecting member and the second reflecting member on the basis of a result of capturing by said imaging unit;
    an analyzing unit operable to analyze a motion of the first reflecting member and a motion of the second reflecting member on the basis of a result of detecting by said detecting unit; and
    a processing unit operable to perform information processing in accordance with a result of analyzing by said analyzing unit to reflect to a video image.

2. The exercise support device as claimed in claim 1 wherein said image generating unit generates the image which guides jumping action of the player.

3. The exercise support device as claimed in claim 1 wherein the first reflecting member and the second reflecting member reflect received light retroreflectively.

4. The exercise support device as claimed in claim 1 further comprising:
    a light emitting unit operable to emit light intermittently, wherein
    said imaging unit captures images of the first reflecting member and the second reflecting member with light illumination and without light illumination of said light emitting unit, and
    said detecting unit detects the first reflecting member and the second reflecting member on the basis of a picture which is obtained by the image capturing with light illumination and a picture which is obtained by the image capturing without light illumination.

5. The exercise support device as claimed in claim 1 wherein said imaging unit capture an image of the first reflecting member worn just under a left knee of the player and an image of the second reflecting member worn just under a right knee of the player.

6. An exercise support method comprising the steps of:
    generating an image which guides stepping action of a player;
    capturing an image of a first reflecting member worn on a left leg of the player and an image of a second reflecting member worn on a right leg of the player;
    detecting the first reflecting member and the second reflecting member on the basis of a result of said step of capturing;
    using a processor to analyze a motion of the first reflecting member and a motion of the second reflecting member on the basis of a result of said step of detecting; and
    performing information processing in accordance with a result of said step of analyzing to reflect to a video image.

7. A non-transitory computer-readable recording medium encoded with a computer program which enables a computer to perform a process, the process comprising:
    generating an image which guides stepping action of a player;
    capturing an image of a first reflecting member worn on a left leg of the player and an image of a second reflecting member worn on a right leg of the player;
    detecting the first reflecting member and the second reflecting member on the basis of a result of said step of capturing;
    analyzing a motion of the first reflecting member and a motion of the second reflecting member on the basis of a result of said step of detecting; and
    performing information processing in accordance with a result of said step of analyzing to reflect to a video image.

* * * * *